US011608649B2

(12) United States Patent
Hammond et al.

(10) Patent No.: US 11,608,649 B2
(45) Date of Patent: Mar. 21, 2023

(54) LOCKING MECHANISM FOR FALL PROTECTION

(71) Applicant: The Boeing Company, Chicago, IL (US)

(72) Inventors: James F. Hammond, Mukilteo, WA (US); Kory K. Dehart, Mount Vernon, WA (US); Leopold Orozco, Redmond, WA (US)

(73) Assignee: The Boeing Company, Arlington, VA (US)

( * ) Notice: Subject to any disclaimer, the term of this patent is extended or adjusted under 35 U.S.C. 154(b) by 346 days.

(21) Appl. No.: 16/816,461

(22) Filed: Mar. 12, 2020

(65) Prior Publication Data

US 2021/0285241 A1    Sep. 16, 2021

(51) Int. Cl.
*E04G 5/00* (2006.01)
*B64F 5/10* (2017.01)
*E04G 1/00* (2006.01)

(52) U.S. Cl.
CPC .............. *E04G 5/001* (2013.01); *B64F 5/10* (2017.01); *E04G 1/00* (2013.01)

(58) Field of Classification Search
CPC .. E04G 5/001; E04G 1/00; E04G 5/14; E04G 5/141; E04G 21/3223; E04G 21/3228; E05B 63/0008; E05B 57/00; E05B 35/008; E05C 3/00; E05C 3/12; E05C 3/16; E05C 3/162; E05C 3/36; Y10T 292/106;

(Continued)

(56) References Cited

U.S. PATENT DOCUMENTS 2,594,533 A  * 4/1952  Baker ................. E05D 11/1064
                                                    16/326
2,692,784 A  * 10/1954  McRae, Jr. ............. B64C 25/26
                                                    403/92

(Continued)

FOREIGN PATENT DOCUMENTS

CN      201793023 U      4/2011
CN      109733637 A      5/2019

(Continued)

OTHER PUBLICATIONS

European Search Report; Application EP21158500; dated Jul. 28, 2021.

*Primary Examiner* — Daniel P Cahn
*Assistant Examiner* — Shiref M Mekhaeil
(74) *Attorney, Agent, or Firm* — Duft & Bornsen, PC

(57) ABSTRACT

A flip door assembly includes a flip door and an interlock that controls whether the flip door may be opened. A worker safety system in one embodiment includes a work stand, a safety barrier, and a flip door assembly. The flip door assembly selectively engages with a keyed portion of the safety barrier to prevent access to a defined area by a worker. The flip door assembly includes a flip door having a top surface that is substantially planar to a top surface of the work stand when closed, and substantially non-planar to the top surface of the work stand when open. The flip door assembly further includes an interlock that prevents the flip door from opening when the keyed portion of the safety barrier is disengaged from the interlock, and allows the flip door to open when the keyed portion of the safety barrier is engaged with the interlock.

20 Claims, 21 Drawing Sheets

(58) Field of Classification Search
CPC .............. Y10T 292/17; E05D 11/1014; E05D 11/1007; B64F 5/40; B66F 17/006; B60R 3/005; E04F 11/1865; E04F 2011/1868
USPC .......................................................... 182/19
See application file for complete search history.

(56) References Cited

U.S. PATENT DOCUMENTS

| | | | | |
|---|---|---|---|---|
| 3,727,721 | A * | 4/1973 | Kulesa | E04G 3/18 182/62 |
| 4,266,380 | A * | 5/1981 | Samolis | E02D 29/1463 404/25 |
| 5,308,023 | A * | 5/1994 | Kress | B64C 25/10 244/102 R |
| 5,547,460 | A * | 8/1996 | Ishikawa | A61H 1/00 601/84 |
| 5,797,218 | A * | 8/1998 | Holland | E06B 9/04 49/55 |
| 6,428,060 | B1 * | 8/2002 | Metz | E05C 3/042 292/227 |
| 6,857,677 | B1 * | 2/2005 | Giles | B62D 33/033 296/43 |
| 7,686,381 | B1 * | 3/2010 | Leonard | B60P 3/343 296/172 |
| 8,028,641 | B1 * | 10/2011 | Sly | B63B 29/04 297/3 |
| 8,246,285 | B2 * | 8/2012 | Maguin | B66F 7/0625 182/113 |
| 8,672,380 | B2 * | 3/2014 | Carter | B60R 3/005 182/113 |
| 9,067,646 | B2 * | 6/2015 | Admire | B63B 35/34 |
| 9,309,717 | B2 * | 4/2016 | Hardison, III | E06B 9/86 |
| 9,450,325 | B1 * | 9/2016 | Lai | H01R 13/4534 |
| 9,957,016 | B2 * | 5/2018 | Grimaldi | B63B 17/04 |
| 10,407,958 | B1 * | 9/2019 | Tsou | E05D 3/02 |
| 10,569,863 | B2 * | 2/2020 | Bennett | F16H 25/18 |
| 10,730,372 | B2 * | 8/2020 | Roth | B60P 1/435 |
| 11,142,913 | B2 * | 10/2021 | Noohi | E04B 1/003 |
| 2004/0056510 | A1 * | 3/2004 | Benz | B60P 3/36 296/162 |
| 2004/0104382 | A1 * | 6/2004 | Collins | E04G 21/3233 256/59 |
| 2008/0296922 | A1 * | 12/2008 | Diamond | B60P 3/34 296/26.13 |
| 2011/0041406 | A1 * | 2/2011 | Jimenez Del Amo | E05B 53/005 49/142 |
| 2011/0289726 | A1 * | 12/2011 | Zhang | H04M 1/022 16/250 |
| 2012/0017961 | A1 * | 1/2012 | Hughes | E04H 15/48 135/145 |
| 2013/0174771 | A1 * | 7/2013 | Teague | B63B 25/00 114/343 |
| 2016/0221667 | A1 * | 8/2016 | Bennett | F16H 25/18 |
| 2019/0300129 | A1 * | 10/2019 | Knight | B63B 27/00 |
| 2021/0017774 | A1 * | 1/2021 | Phan | E04G 1/00 |
| 2021/0363804 | A1 * | 11/2021 | Mitchell | E05D 11/1014 |

FOREIGN PATENT DOCUMENTS

| | | |
|---|---|---|
| EP | 2572759 A1 | 3/2013 |
| KR | 20140068451 A | 6/2014 |
| KR | 20190017837 A | 2/2019 |
| WO | WO-2015036730 A1 * | 3/2015 ............ B64C 25/20 |

\* cited by examiner

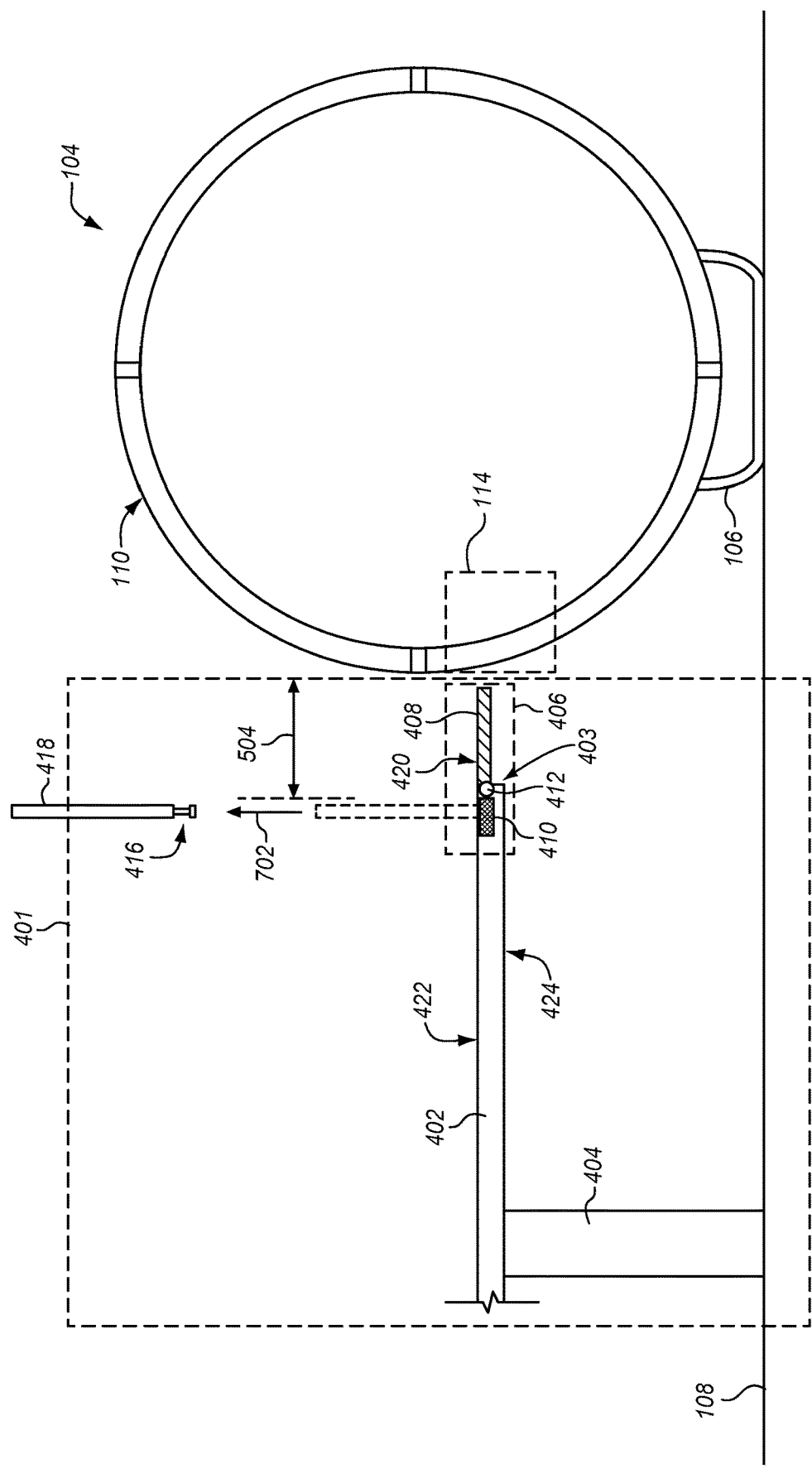

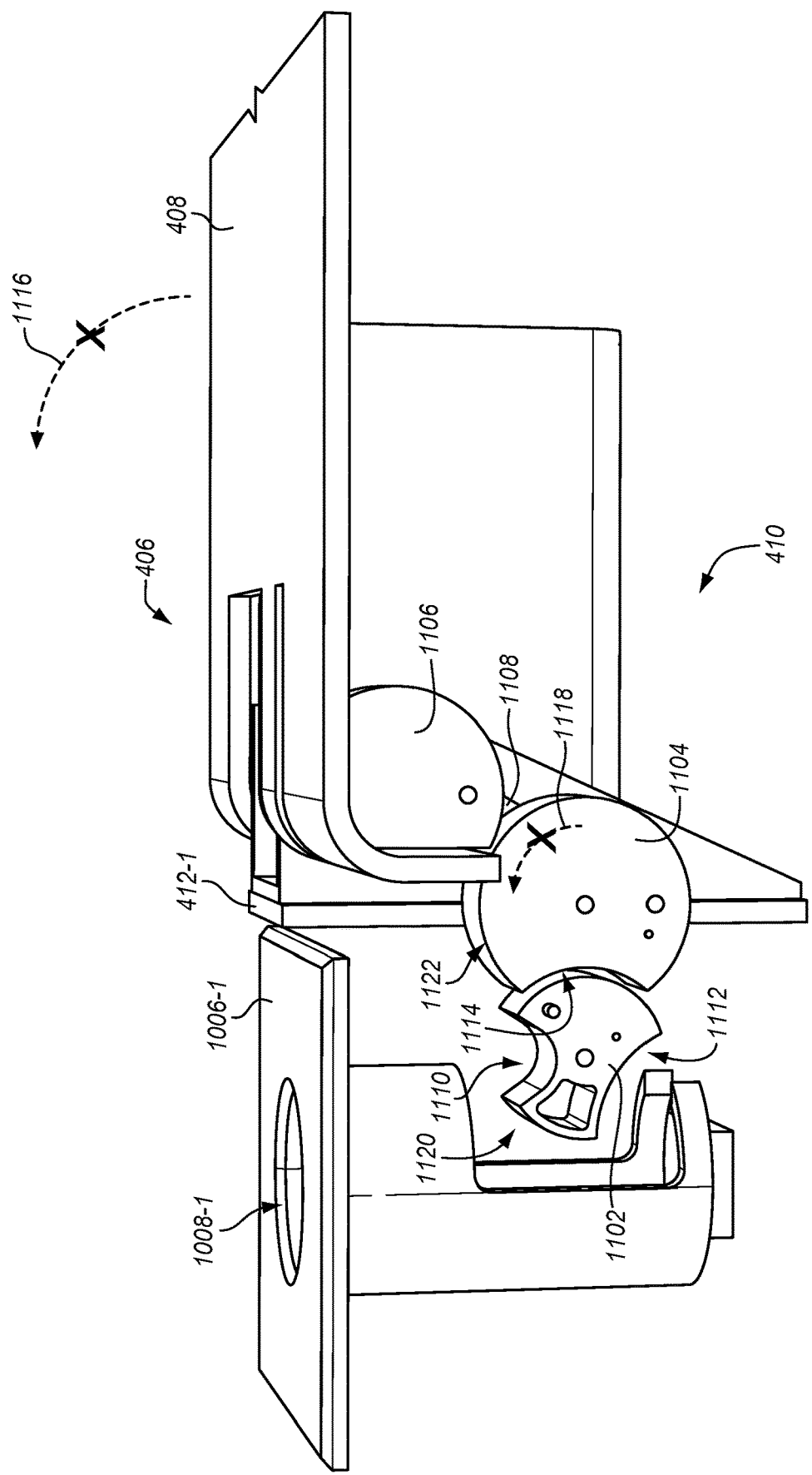

LOCKING MECHANISM FOR FALL PROTECTION

FIELD

This disclosure relates to the field of manufacturing, and in particular, to mitigating fall risks during various manufacturing processes.

BACKGROUND

During a fuselage assembly process for an aircraft, temporary work stands are typically placed proximate to the exterior of the fuselage in order to allow the workers to work on the fuselage. In some cases, it is desirable to perform work on areas of the fuselage that may be partially obscured by the work stands (e.g., when ends of the work stands terminate proximate to the exterior of the fuselage. In order to enable this activity, flip doors are included in the floor of the work stands near the fuselage that open up portions of the floor in the work stands and allow workers underneath the platforms to access the fuselage or for equipment to pass through the opening in the floor of the work stand.

Problems can arise, however, when workers on the platforms inadvertently fall through the open flip doors and become injured. Thus, it is desirable to mitigate the fall risk to workers when the flip doors are open without the use of complicated safety equipment, portable barriers, etc.

SUMMARY

A flip door assembly includes a flip door and an interlock that controls whether the flip door may be opened. The flip door assembly may be integrated into a work stand such that, when the work stand is located proximate to a fuselage of an aircraft during manufacturing, the flip door may be opened to allow access to a portion of the fuselage that is obscured by the flip door when the flip door is closed. When a keyed portion of a safety barrier is engaged with the interlock, the flip door may be opened to allow access to the fuselage. The safety barrier, when engaged with the interlock, isolates a defined area from a worker, preventing the worker from inadvertently falling through the open flip door.

One embodiment comprises a worker safety system that includes a work stand, a safety barrier, and a flip door assembly. The safety barrier has a keyed portion. The flip door assembly selectively engages with the keyed portion of the safety barrier to prevent access to a defined area by a worker. The flip door assembly includes a flip door having a top surface that is substantially planar to a top surface of the work stand when closed, and substantially non-planar to the top surface of the work stand when open. The flip door assembly further includes an interlock that prevents the flip door from opening when the keyed portion of the safety barrier is disengaged from the interlock, and allows the flip door to open when the keyed portion of the safety barrier is engaged with the interlock.

Another embodiment comprises a method of operating a worker safety system in a manufacturing environment. The method comprises providing a work stand that includes a flip door and an interlock that controls opening and closing of the flip door based on whether a keyed portion of a safety barrier is engaged or disengaged with the interlock. The method further comprises preventing the flip door from opening in response to the keyed portion of the safety barrier not being engaged with the interlock. The method further comprises engaging the keyed portion of the safety barrier with the interlock to prevent access to a defined area by a worker, and opening the flip door.

Another embodiment comprises a worker safety system for a manufacturing environment. The worker safety system includes a work stand having a flip door and an interlock for the flip door, and a safety barrier. The safety barrier has a keyed portion that prevents access to a defined area when the keyed portion is engaged with the interlock. The interlock allows the flip door to open when the keyed portion is engaged with the interlock, and prevents the flip door from opening when the keyed portion is not engaged with the interlock.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIGS. 4-9 depict a manufacturing environment in an illustrative embodiment.

FIGS. 11-14 are isometric views of a portion of the flip door assembly of FIG. 10A in illustrative embodiments.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
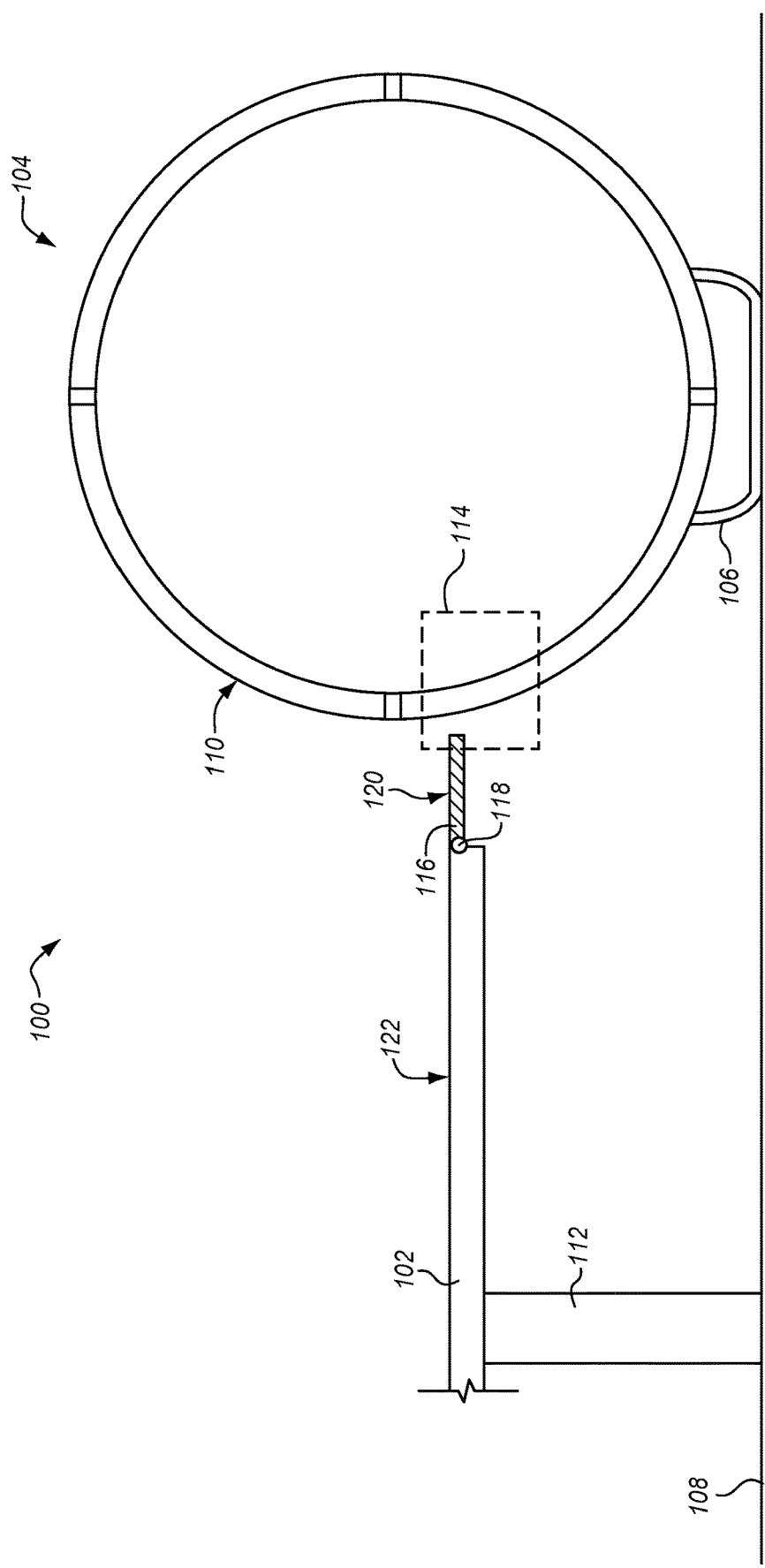
FIGS. 1-3 depict a manufacturing environment in the prior art.
Figure 2:
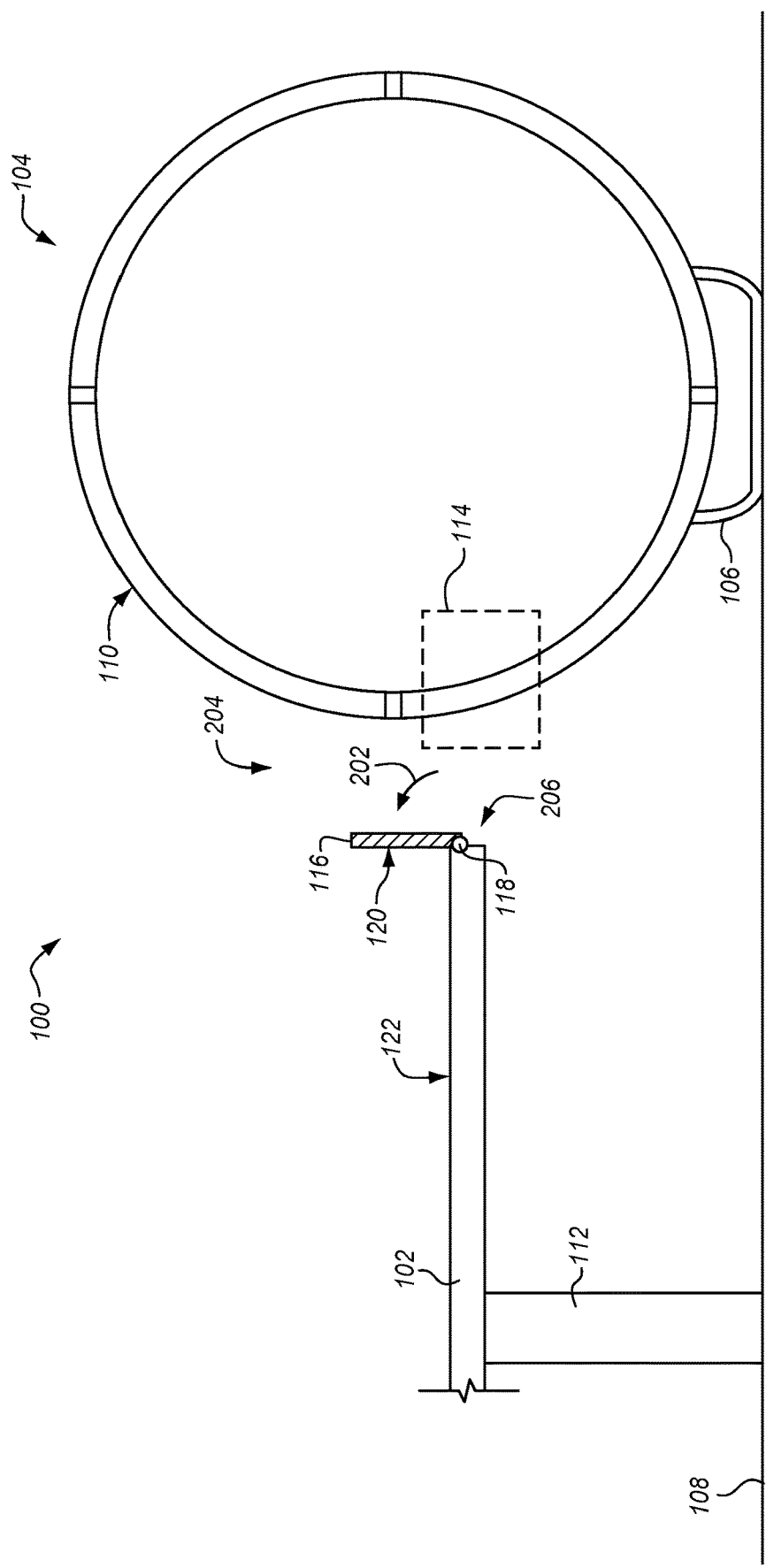
Figure 3:
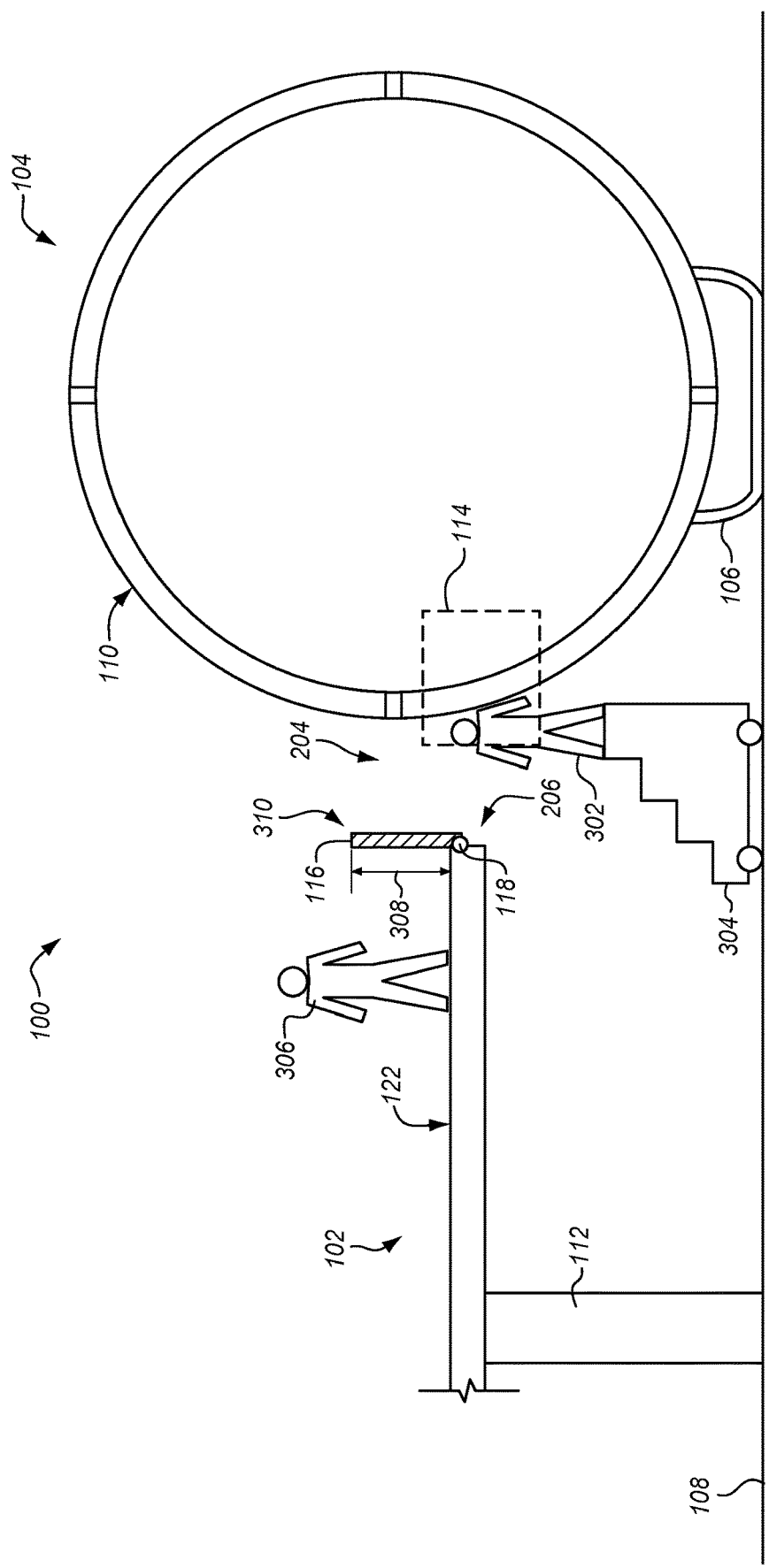

FIGS. 1-3 depict a manufacturing environment 100 in the prior art. In some embodiments, environment 100 may comprise an aircraft manufacturing environment. However, environment 100 may comprise other types of environments in different embodiments. Environment 100 includes a raised platform 102 for assembling and/or performing fabrication processes on a fuselage 104. In FIGS. 1-3, fuselage 104 is supported by a fixture 106 on a shop floor 108 during assembly, and raised platform 102 is located proximate to an exterior surface 110 of fuselage 104 to allow workers to perform an assembly and/or manufacturing processes on fuselage 104. Raised platform 102 is raised above and supported over shop floor 108 using one or more vertical supports 112. In order to provide access to a portion 114 of fuselage 104, raised platform 102 includes a door 116 that rotatably connects to raised platform 102 using one or more hinges 118. When door 116 is in the closed position as illustrated in FIG. 1, a top surface 120 of door 116 is substantially coincident with a walking surface 122 of raised platform 102, thereby allowing a worker to walk on both walking surface 122 and top surface 120 of door 116 in order to access fuselage 104.

When door 116 rotates in the direction of arrow 202 into the open position (see FIG. 2), top surface 120 of door 116 may form an angle with walking surface 122 of raised platform 102 of about ninety degrees, exposing an opening 204 between exterior surface 110 of fuselage 104 and end 206 of raised platform 102 that is proximate to fuselage 104.

Door 116 in the open position may allow a worker 302 to work below raised platform 102 and access portion 114 of fuselage 104 during a fabrication and/or manufacturing process performed on fuselage 104 (see FIG. 3). For instance, a mobile platform 304 may be moved into position underneath door 116, with worker 302 utilizing mobile platform 304 to access and raise door 116 into the open position illustrated in FIG. 3. This may pose a fall risk for workers 306 working on raised platform 102, especially when a height 308 of door 116 between walking surface 122 of raised platform 102 and end 310 of door 116 is low. In particular, height 308 of door 116 may be lower than the minimum safety standards in place within environment 100, or the structural integrity of door 116 may be insufficient to act as a barrier.

In the embodiments described herein, a flip door assembly is described that uses an interlock that prevents its flip door from being opened unless a safety barrier is engaged with the interlock. With the safety barrier in place and engaged with the interlock, the flip door can be opened. The safety barrier so engaged prevents access to a defined area by a worker. Once the flip door has been opened, the safety barrier cannot be removed from the interlock, thereby preventing inadvertent removal of the safety barrier while the flip door remains open. Once the flip door is closed, the safety barrier can be removed from the interlock to allow access to the defined area by the worker. This mitigates the potential fall hazards to workers operating on work stands that utilize flip doors.

FIGS. 4-9 depict a manufacturing environment 400 in illustrative embodiments. In some embodiments, environment 400 may comprise an aircraft manufacturing environment. However, environment 400 may comprises other types of environments in different embodiments.

Environment 400 in this embodiment includes a worker safety system 401 that is proximate to fuselage 104 and used by workers for assembling and/or performing fabrication processes on fuselage 104. Worker safety system 401 in this embodiment includes a work stand 402, a flip door assembly 406, and a safety barrier 418.

Work stand 402 is located proximate to exterior surface 110 of fuselage 104 to allow workers to perform assembly and/or manufacturing processes on a portion 114 of fuselage 104 that is proximate to an end 403 of work stand 402. Work stand 402 is raised above and supported over shop floor 108 using one or more vertical supports 404. In order to provide access to portion 114 of fuselage 104, work stand 402 includes flip door assembly 406. Flip door assembly 406 includes a flip door 408 and an interlock 410. In some embodiments, interlock 410 is completely mechanical in design and does not rely on electromechanical elements, thereby simplifying its design and use. In this embodiment, flip door assembly 406 is proximate to end 403 of work stand 402, although in other embodiments, flip door assembly 406 may be located at different positions along work stand 402.

In this embodiment, flip door assembly 406 includes one or more rotating members 412 that allow flip door 408 to rotate in the direction of arrow 414 when certain conditions are met. In particular, interlock 410 of flip door assembly 406 prevents flip door 408 from pivoting at rotating member 412 in the direction of arrow 414 into the open position unless a keyed portion 416 on a safety barrier 418 is engaged with interlock 410 of flip door assembly 406.

Figure 4:
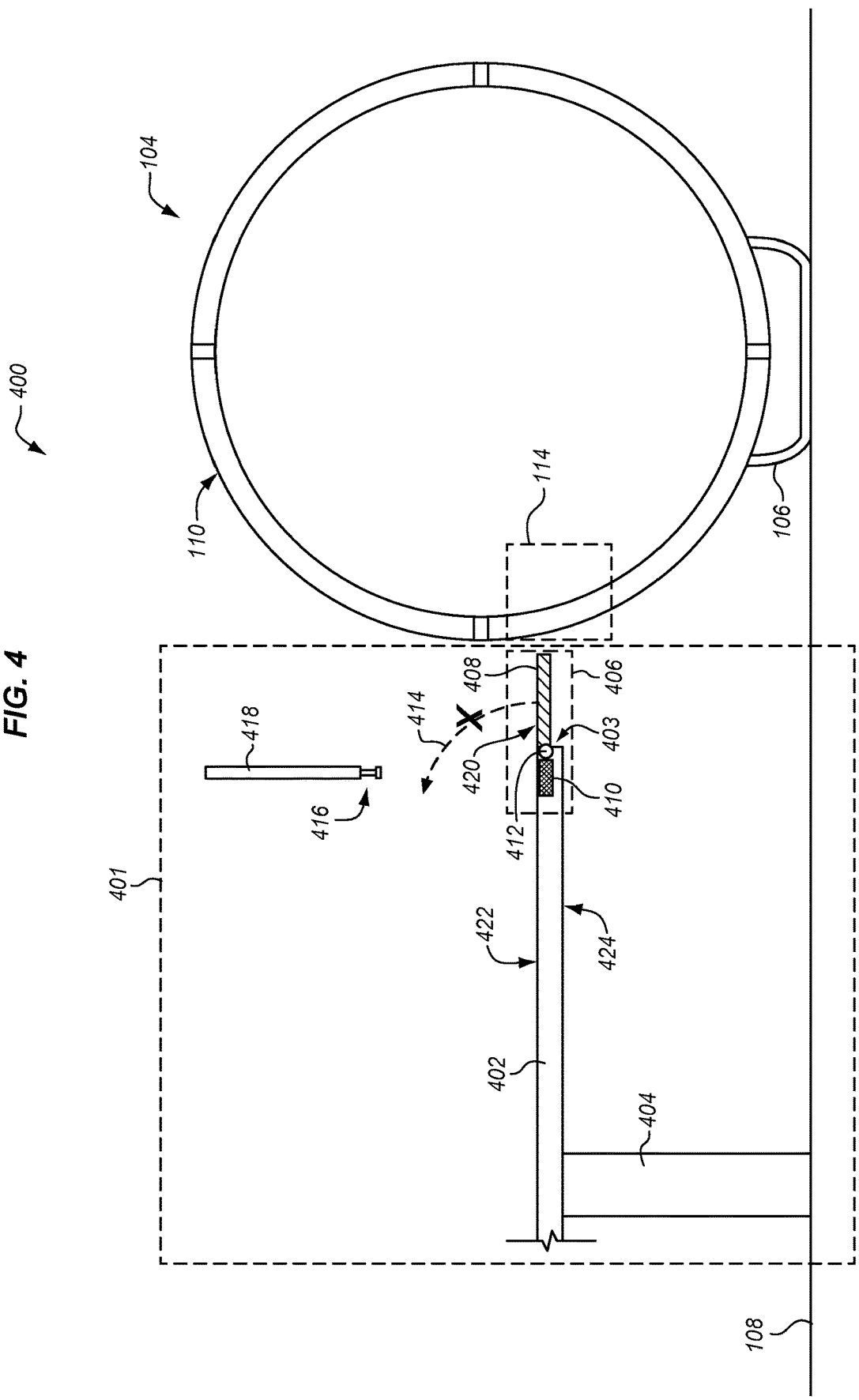

When flip door 408 is in the closed position as illustrated in FIG. 4, a top surface 420 of flip door 408 may be substantially coincident with a top surface 422 of work stand 402, thereby allowing a worker to walk on both top surface 422 of work stand 402 and top surface 420 of flip door 408 in order to access fuselage 104. FIG. 4 also illustrates a bottom surface of 424 of work stand 402 that opposes top surface 422 of work stand 402.

Figure 5:
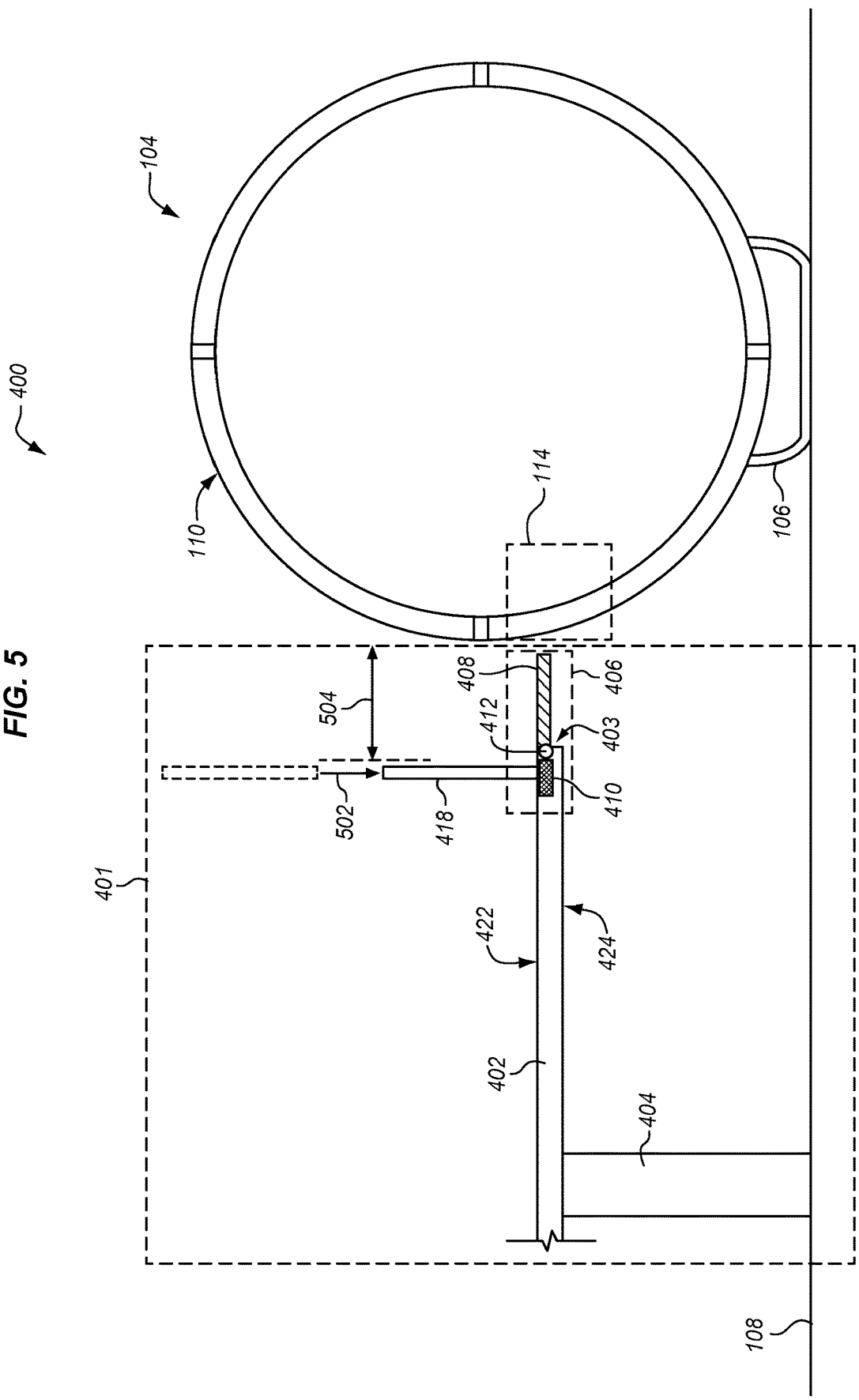
Figure 6:
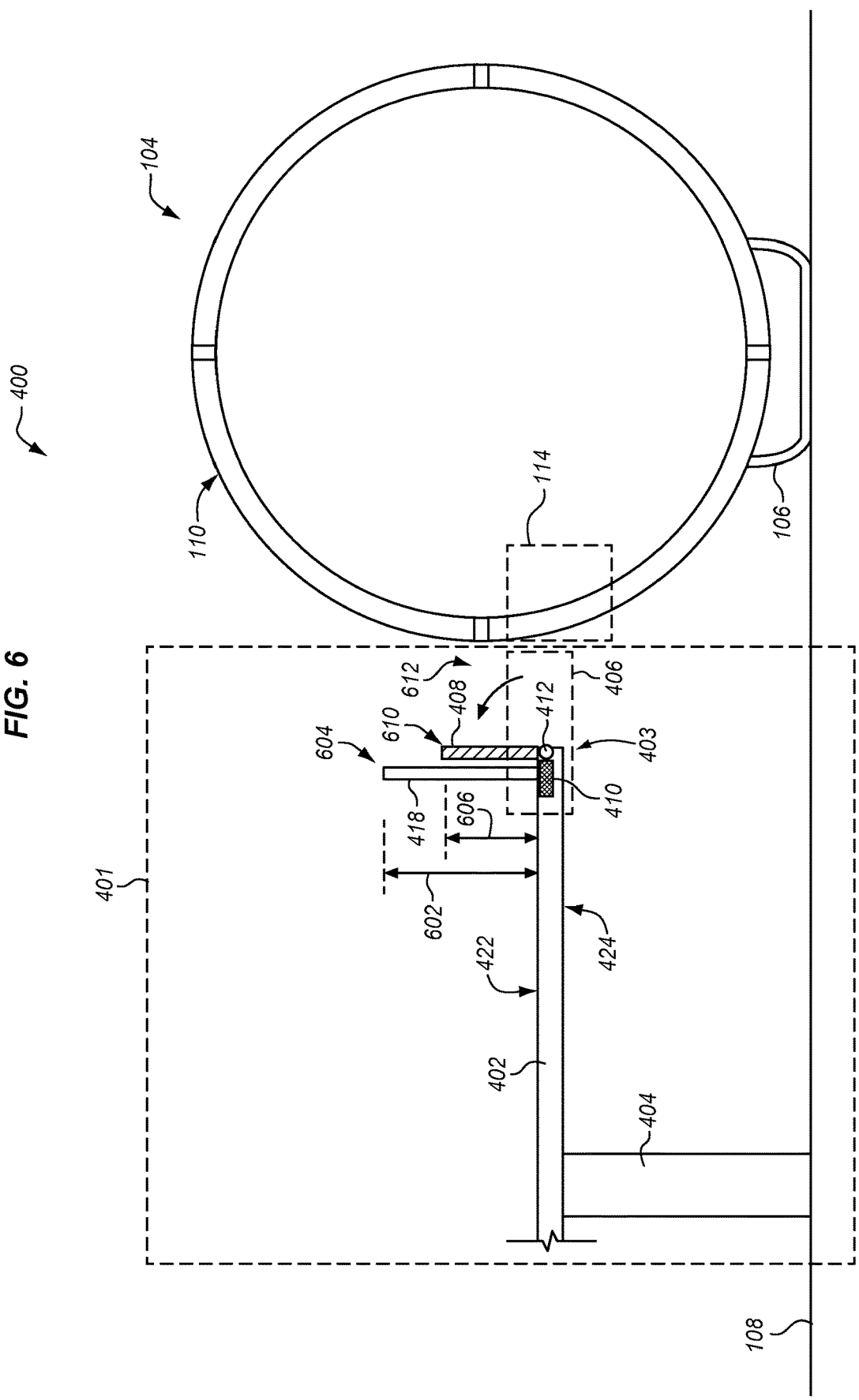

In order to open flip door 408, safety barrier 418 is moved in the direction of arrow 502 (see FIG. 5) to allow keyed portion 416 (not shown in FIG. 5) on safety barrier 418 to engage with interlock 410 of flip door assembly 406. With safety barrier 418 in place as illustrated in FIG. 5, workers on work stand 402 are prevented from accessing a defined area 504 that exists around flip door 408. In this embodiment, defined area 504 is located between safety barrier 418 and fuselage 104. With safety barrier 418 in place and keyed portion 416 engaged with interlock 410, flip door 408 is no longer locked in the closed position illustrated in FIG. 5, but rather, is released by interlock 410 to rotate in the direction of arrow 414 into the open position as illustrated in FIG. 6. With flip door 408 open, an opening 612 is formed between flip door 408 and exterior surface 110 of fuselage 104.

With flip door 408 in the open position as illustrated in FIG. 6, it is evident that a height 602 between top surface 422 of work stand 402 and an end 604 of safety barrier 418 is greater in this embodiment than a height 606 between top surface 422 of works stand 402 and an end 610 of flip door 408. This provides a larger measure of safety for workers on work stand 402 than height 606 of flip door 408 alone, thereby mitigating the fall risk for workers on work stand 402 when flip door 408 is open.

With safety barrier 418 in place as illustrated in FIGS. 5-6, flip door 408 is free to rotate between the closed position illustrated in FIG. 5 and the open position illustrated in FIG. 6. Although flip door 408 has been illustrated in the open position with end 610 of flip door 408 being above top surface 422 of work stand 402, other embodiments may allow flip door 408 to open in the opposite direction, with end 610 of flip door 408 below bottom surface 424 of work stand 402. Thus, an open position for flip door 408 is not limited to the specific orientation depicted in FIG. 6.

Figure 7:
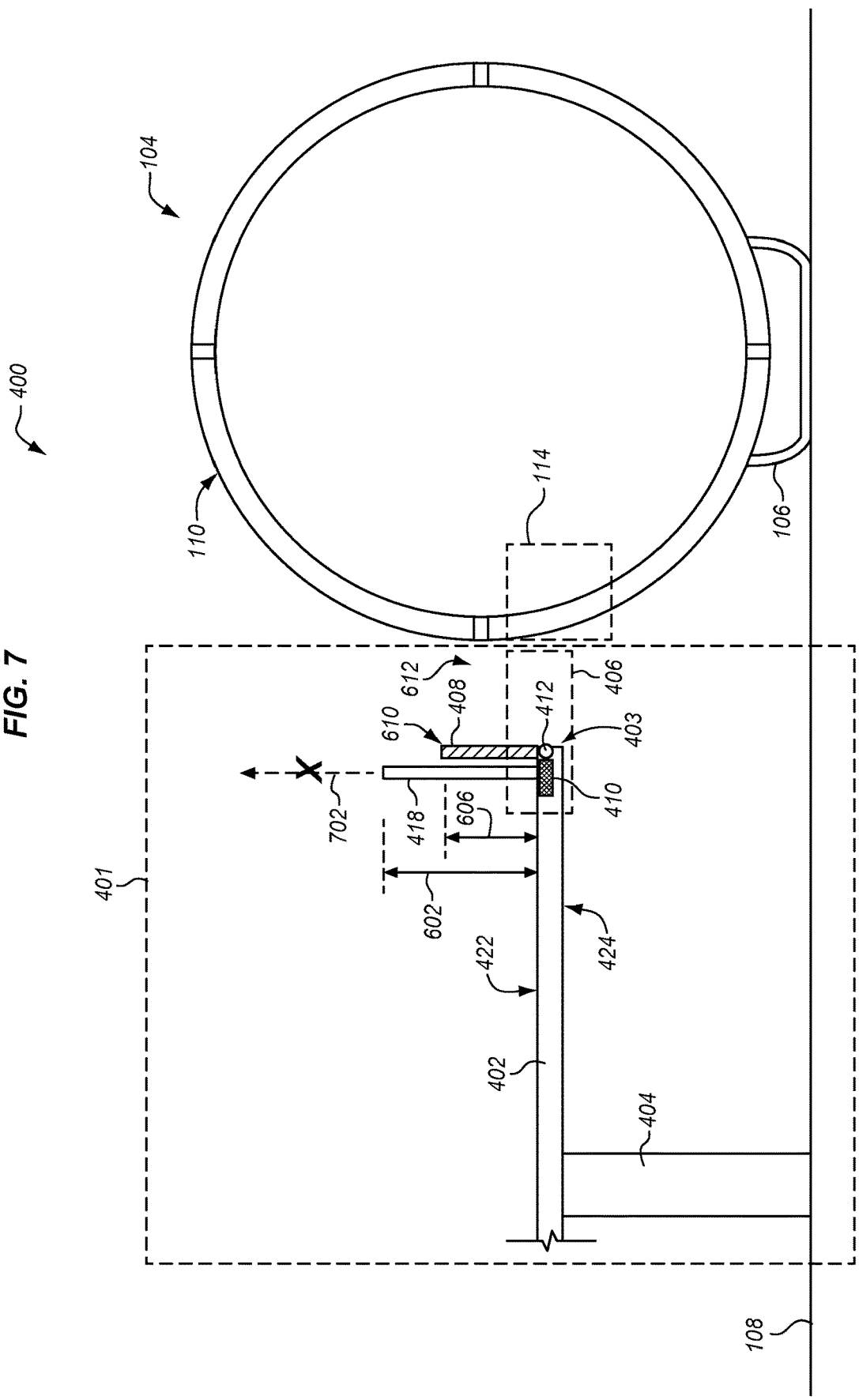

With flip door 408 in the open position illustrated in FIG. 7, keyed portion 416 of safety barrier 418 is locked to interlock 410 and cannot be removed from its current placement (e.g. safety barrier 418 is prevented from moving in the direction of arrow 702). In particular, interlock 410 is engaged with and locks keyed portion 416 of safety barrier 418 in place, thereby preventing safety barrier 418 from being removed from work stand 402. This ensures that safety barrier 418 remains in place to prevent inadvertent falls by workers through flip door 408 while flip door 408 is open.

Figure 8:
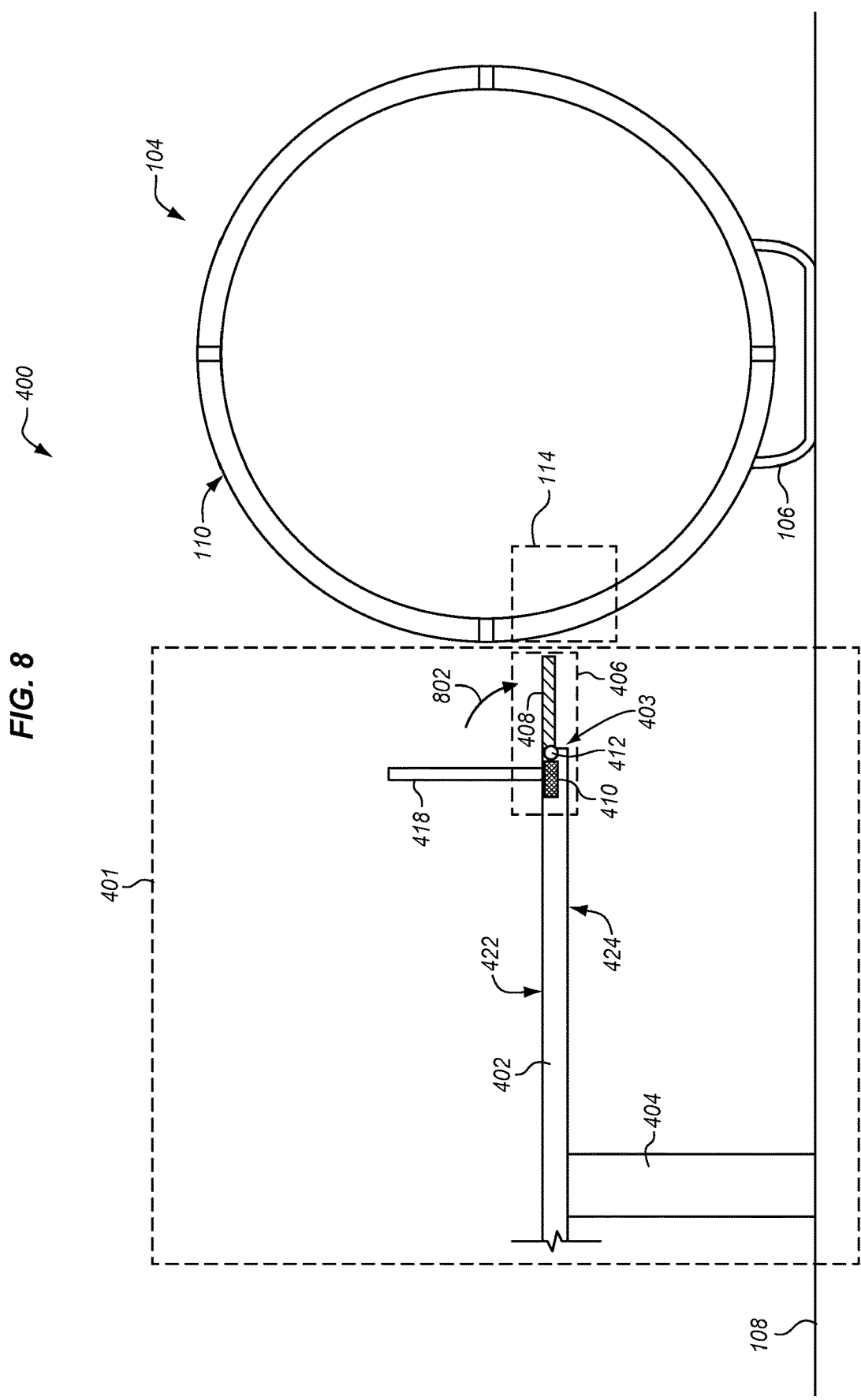

In order to remove keyed portion 416 of safety barrier 418 from interlock 410, flip door 408 is first closed as illustrated in FIG. 8 (e.g., flip door 408 moves in the direction of arrow 802), and interlock 410 releases keyed portion 416 of safety barrier 418, thereby allowing safety barrier 418 to be removed from its placement proximate to flip door 408 as illustrated in FIG. 9 (e.g., safety barrier 418 can be moved in the direction of arrow 702 as illustrated in FIG. 9). With safety barrier 418 removed and flip door 408 closed, the previously inaccessible defined area 504 blocked by safety barrier 418 is now accessible by a worker operating on work stand 402. For example, with safety barrier 418 removed, a worker can operate freely across both top surface 422 of work stand 402 and top surface 420 of flip door 408. Generally, safety barrier 418 may have any shape as desired in order to prevent a worker on work stand 402 from falling though opening 612 created when flip door 408 is open (see FIG. 6). Thus, safety barrier 418 may have complicated shapes depending on where flip door 408 is positioned on work stand 402. If flip door 408 is near end 403 of work stand 402, then safety barrier 418 may be a simple planar gate which isolates workers on work stand 402 from defined area 504. If flip door 408 is more centrally located on work stand 402, then safety barrier 418 may include multiple sides that create a volumetric defined area around flip door 408 that is inaccessible by a worker on work stand 402 as long as safety barrier 418 is in place.

Figure 10A:
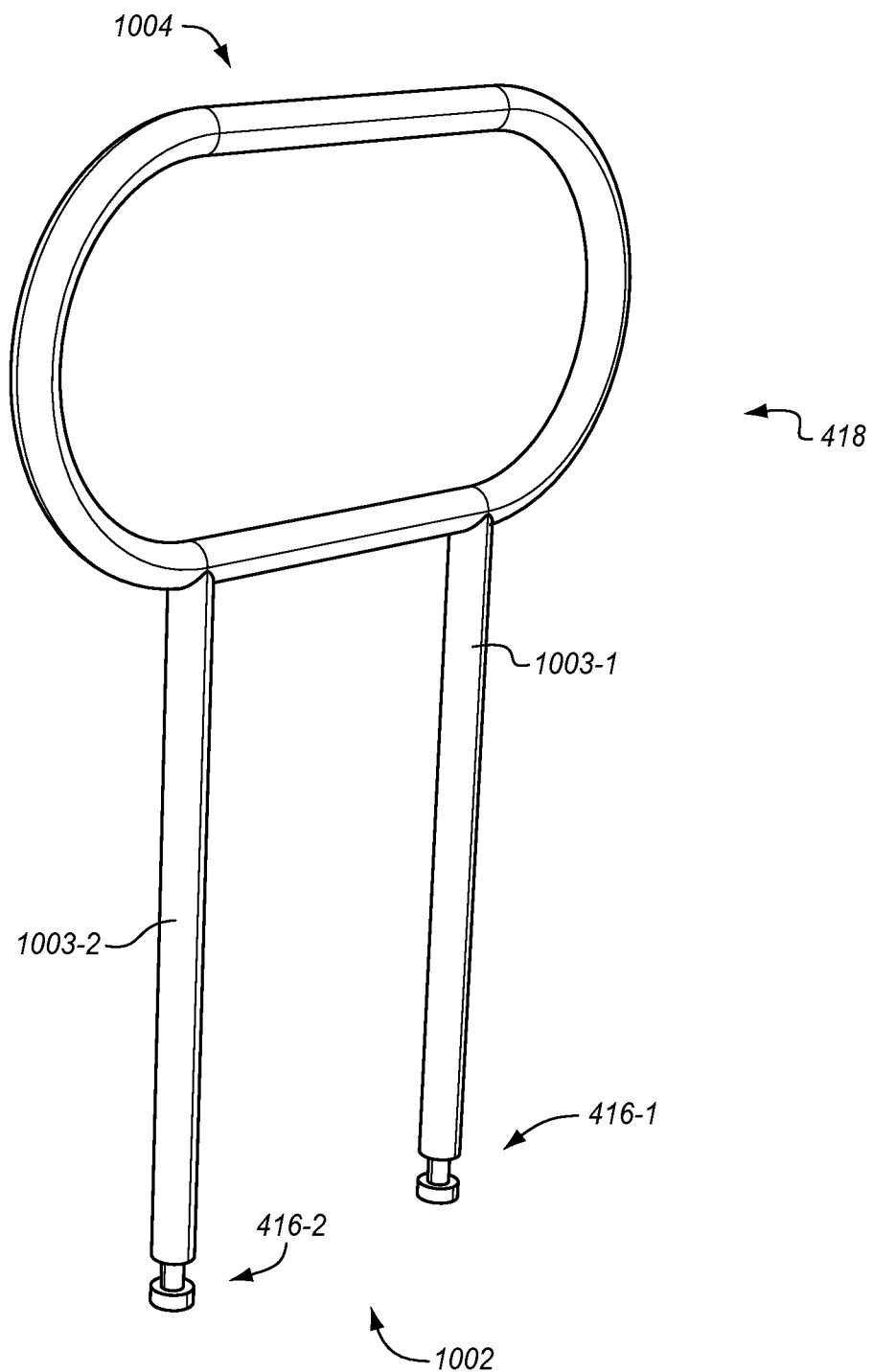
FIG. 10A is an isometric view of a safety barrier in an illustrative embodiment.

FIG. 10A is an isometric view of safety barrier 418 in an illustrative embodiment. In this embodiment, safety barrier 418 has a bottom portion 1002 having legs 1003, each of which include a keyed portion 416, and a top portion 1004 that extends away from interlock 410 when keyed portion 416 is inserted into interlock 410 of flip door assembly 406. The particular configuration of safety barrier 418 in FIG. 10A is merely illustrated for purposes of discussion. In this view, leg 1003-1 includes keyed portion 416-1 that is proximate to bottom portion 1002, and leg 1003-2 includes keyed portion 416-2 that is proximate to bottom portion 1002 of safety barrier 418

Figure 10B:
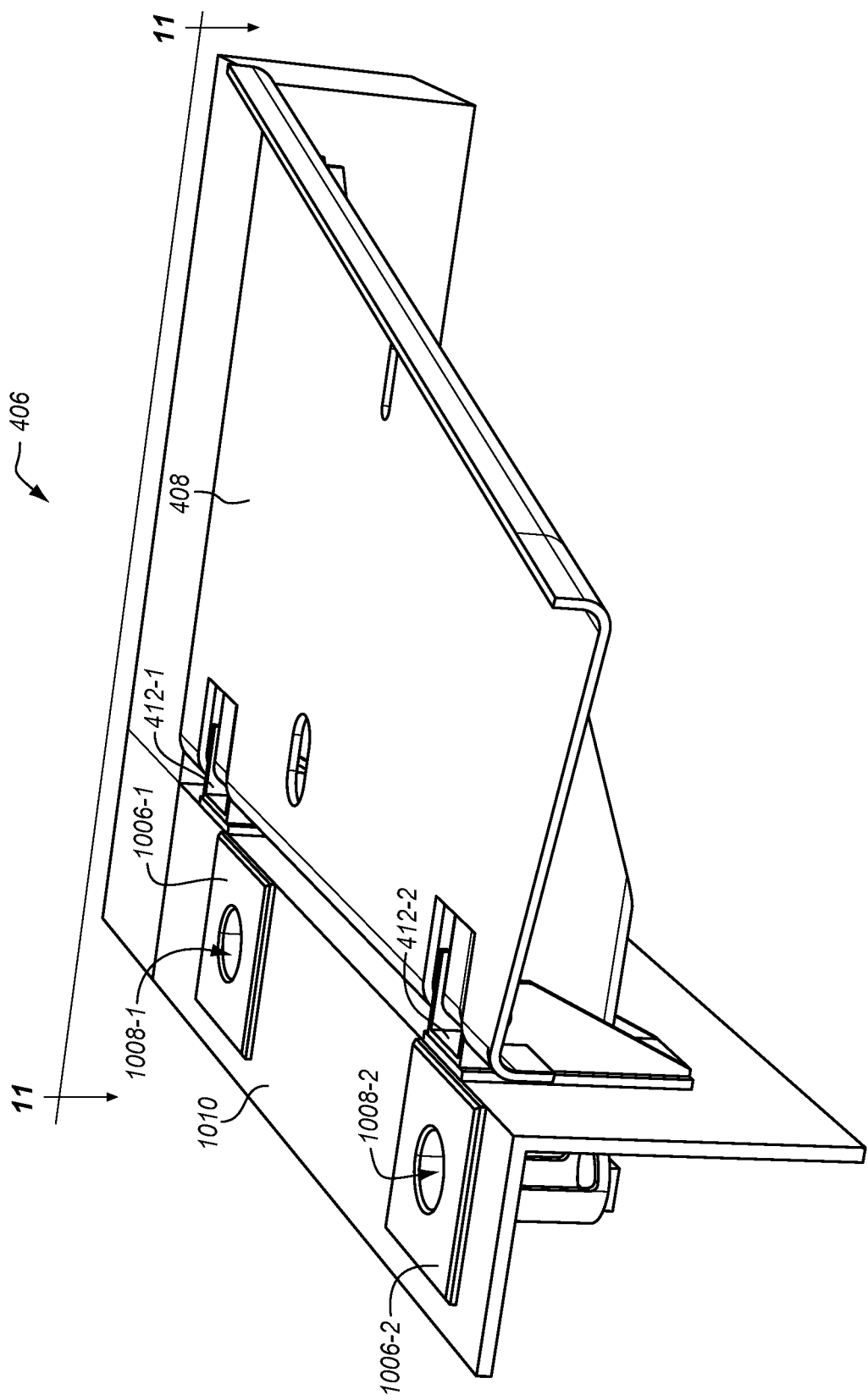
FIG. 10B is an isometric view of a flip door assembly in an illustrative embodiment.

FIG. 10B is an isometric view of flip door assembly 406 in an illustrative embodiment. In this embodiment, flip door 408 of flip door assembly 406 has a particular size and shape, although flip door 408 may have other dimensions in other embodiments. In this embodiment, flip door assembly 406 includes two receptacles 1006 that include openings 1008 that are sized to accept keyed portion 416-1 and keyed portion 416-2 of safety barrier 418 (see FIG. 10A). In particular, receptacle 1006-1 includes opening 1008-1, and receptacle 1006-2 includes opening 1008-2.

FIG. 10B also illustrates that flip door 408 is rotatably mounted to a member 1010 using rotating member 412-1 and rotating member 412-2. In this embodiment, rotating member 412-1 and rotating member 412-2 are illustrated as hinges. Rotating member 412-1 is proximate to receptacle 1006-1, and rotating member 412-2 is proximate to receptacle 1006-2.

In some embodiments, member 1010 may be the portion of work stand 402 proximate to end 403, although in other embodiments, member 1010 is attached to work stand 402 at end 403.

Although two receptacles 1006 and openings 1008 are illustrated in this embodiment of flip door assembly 406, other embodiments may include additional receptacles and openings as a matter of design choice that are based on the design of safety barrier 418. Each receptacle 1006 may include its own interlock 410 in some embodiments, while in other embodiments, a subset of the total number of receptacles 1006 may include interlocks 410. In the embodiment illustrated in FIG. 10B, receptacle 1006-1 includes interlock 410 (not shown), while receptacle 1006-2 does not include interlock 410. However, which of receptacles 1006 include their own interlock 410 is a matter of design choice.

Figure 10C:
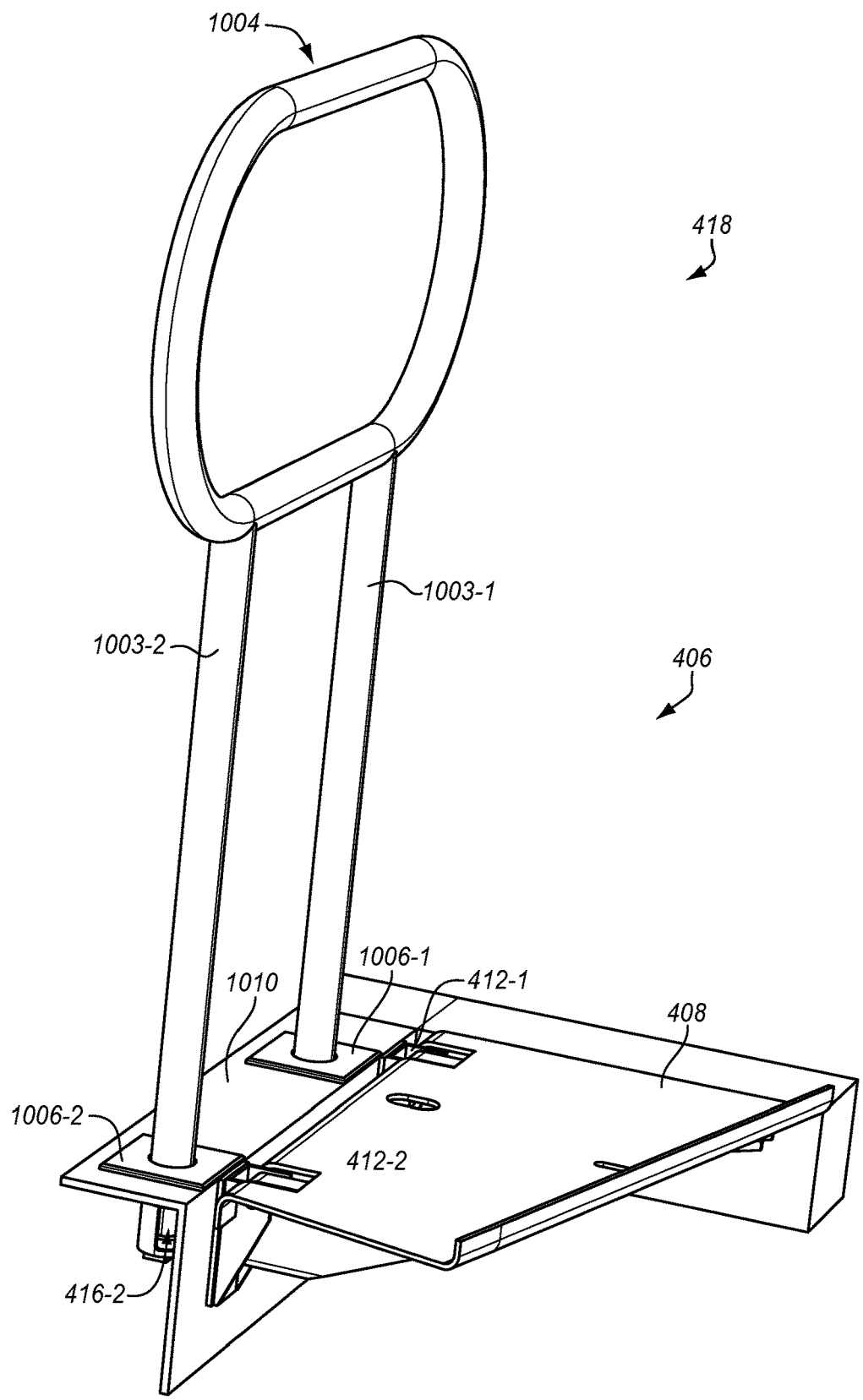
FIG. 10C is an isometric view of both the safety barrier of FIG. 10A and the flip door assembly of FIG. 10B in an illustrative embodiment.

In this embodiment, openings 1008 are sized to allow keyed portion 416-1 and keyed portion 416-2 of safety barrier 418 to engage with receptacles 1006. In particular, keyed portion 416-1 of safety barrier 418 engages with receptacle 1006-1, and keyed portion 416-2 of safety barrier 418-2 engages with receptacle 1006-2. FIG. 10C is an isometric view of safety barrier 418 of FIG. 10A engaged with receptacles 1006 of flip door assembly 406 depicted in FIG. 10B in an illustrative embodiment. When safety barrier 418 is engaged with flip door assembly 406 as illustrated in FIG. 10C, legs 1003 project away from member 1010, allowing safety barrier 418 to block access to flip door 408 from workers entering from the left in FIG. 10C.

FIGS. 11-14 are isometric views of a portion of flip door assembly 406 along cut lines 11-11 of FIG. 10C in illustrative embodiments. In particular, FIGS. 11-14 do not include member 1010 which has been removed to allow interlock 410 to be more easily observed.

In the embodiments illustrated in FIGS. 11-14, interlock 410 includes a first member 1102 proximate to receptacle 1006-1, a second member 1104 proximate to first member 1102, a third member 1106 fixed to flip door 408, and a fourth member 1108 that connects second member 1104 and third member 1106 together. First member 1102 in this view includes a cutout 1110 in an outside edge 1120 of first member 1102 that is proximate to receptacle 1006-1. Cutout 1110 engages with keyed portion 416-1 of leg 1003-1 of safety barrier 418, which is not engaged with receptacle 1006-1 in FIG. 11. When keyed portion 416-1 is not engaged with receptacle 1006-1 (e.g., keyed portion 416-1 is not inserted into opening 1008-1 of receptacle 1006-1), flip door 408 is prevented from opening in the direction of arrow 1116 due to the selective interference between first member 1102 and second member 1104. In particular, attempting to open flip door 408 allows fourth member 1108 to translate a rotation of third member 1106 to second member 1104, which is prevented from rotating when outside edge 1120 of first member 1102 is positioned in a cutout 1114 in an outside edge 1122 of second member 1104. In the FIG. 11, first member 1102 is selectively interfering with a rotation of second member 1104. First member 1102 may be spring biased into the position illustrated in FIG. 11, which may be referred to as residing in a first position in some embodiments. With flip door 408 closed as illustrated in FIG. 11, second member 1104 may also be considered as residing in a first position. Thus, the configuration depicted in FIG. 11 represents a first position for both first member 1102 and second member 1104. In this configuration, first member 1102 prevents second member 1104 from rotating in the direction of arrow 1118, which prevents flip door 408 from being opened in the direction of arrow 1116.

Figure 12:
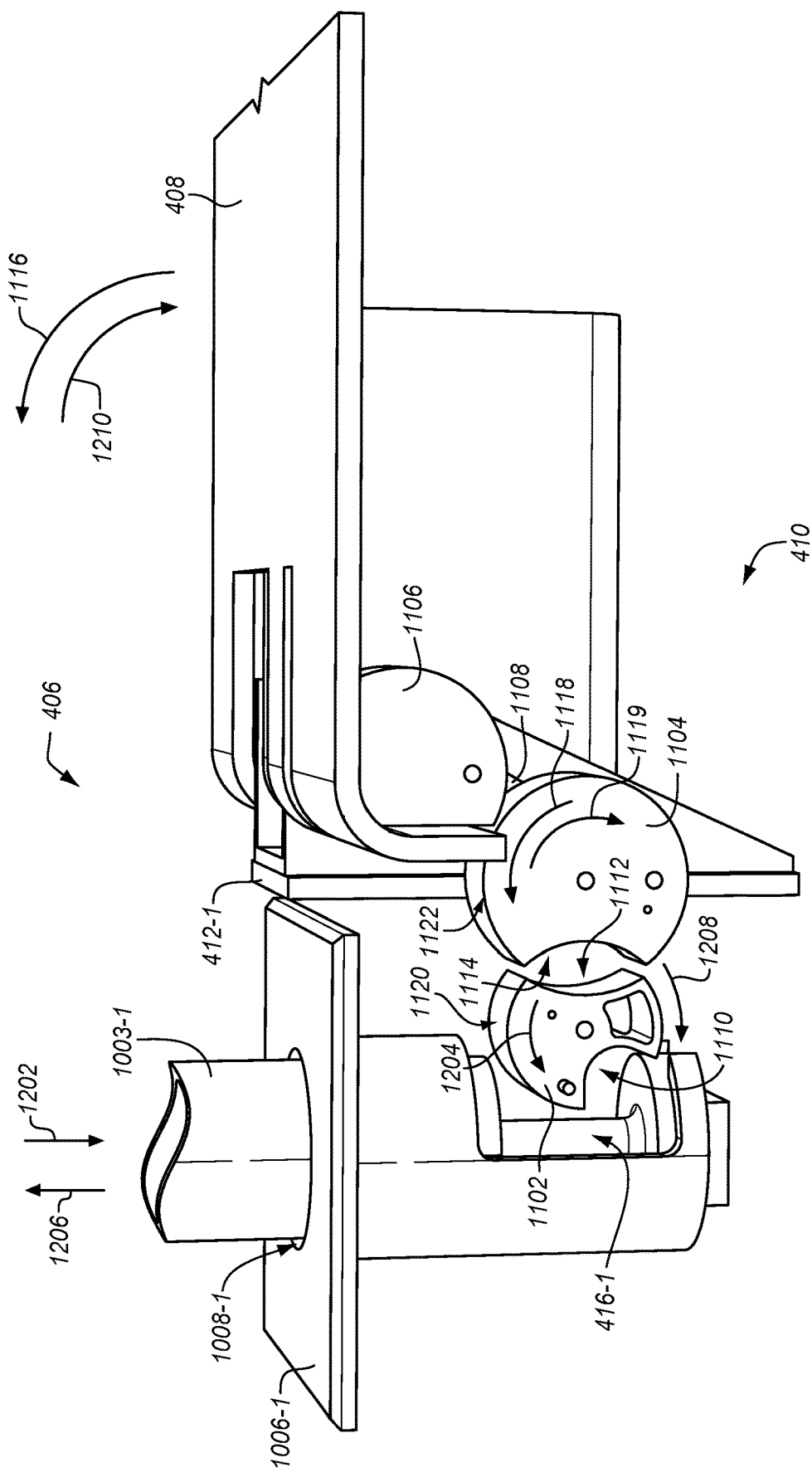

In FIG. 12, keyed portion 416-1 is inserted into opening 1008-1 of receptacle 1006-1 in the direction of arrow 1202, which rotates first member 1102 in the direction of arrow 1204 as cutout 1110 of first member 1102 engages with keyed portion 416-1 on leg 1003-1 of safety barrier 418. When first member 1102 rotates into the position illustrated in FIG. 12, first member 1102 may be referred to as residing in a second position. Thus, FIG. 11 depicts first member 1102 as residing in the first position, while FIG. 12 depicts first member 1102 residing in the second position, with the difference between the first position and the second position for first member 1102 being whether keyed portion 416-1 of safety barrier 418 is engaged with cutout 1110 of first member 1102. For example, if leg 1003-1 of safety barrier 418 is moved in the direction of arrow 1206, keyed portion 416-1 engages with cutout 1110 of first member 1102 and rotates first member 1102 in the direction of arrow 1208, thereby moving outside edge 1120 of first member 1102 into cutout 1114 of second member 1104.

Figure 13:
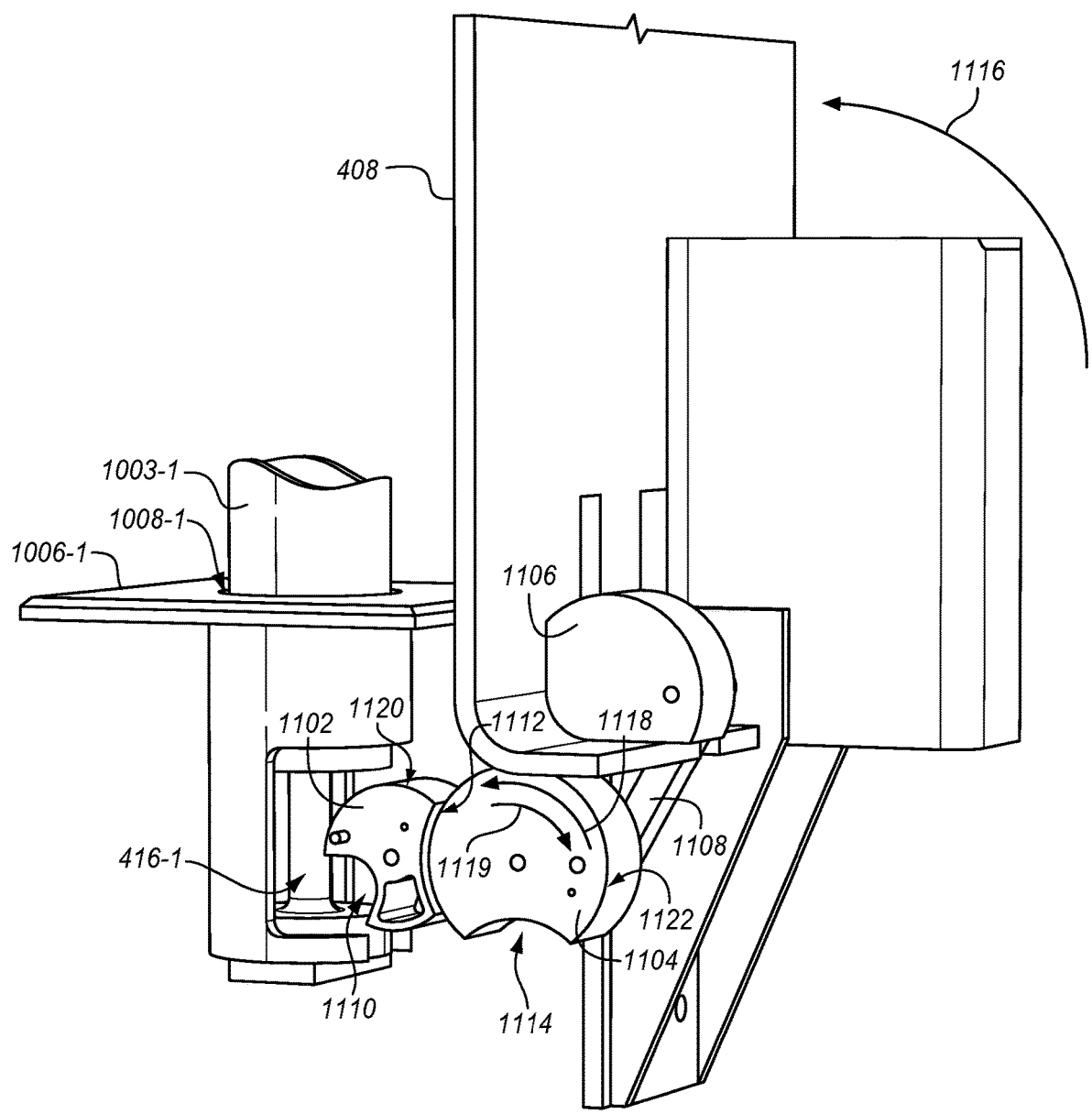

With first member 1102 in the second position illustrated in FIG. 12, second member 1104 is free to rotate in the direction of arrow 1118 and arrow 1119 as illustrated in FIG. 12 when outside edge 1122 of second member 1104 rotates into cutout 1112 of first member 1102 depending on whether flip door 408 moves in the direction of arrow 1116 to open or the direction of an arrow 1210 to close. Thus, first member 1102 is no longer selectively interfering with second member 1104. When flip door 408 is opened as illustrated in FIG. 13, third member 1106 pivots second member 1104 using fourth member 1108 in the direction of arrow 1118. In FIG. 13, second member 1104 may be considered in a second position. Thus, FIG. 12 depicts second member 1104 in the first position, while FIG. 13 depicts second member 1104 in the second position. When flip door 408 translates from the open position depicted in FIG. 13 to the closed position depicted in FIG. 12, second member 1104 rotates in the direction of arrow 1119.

Figure 14:
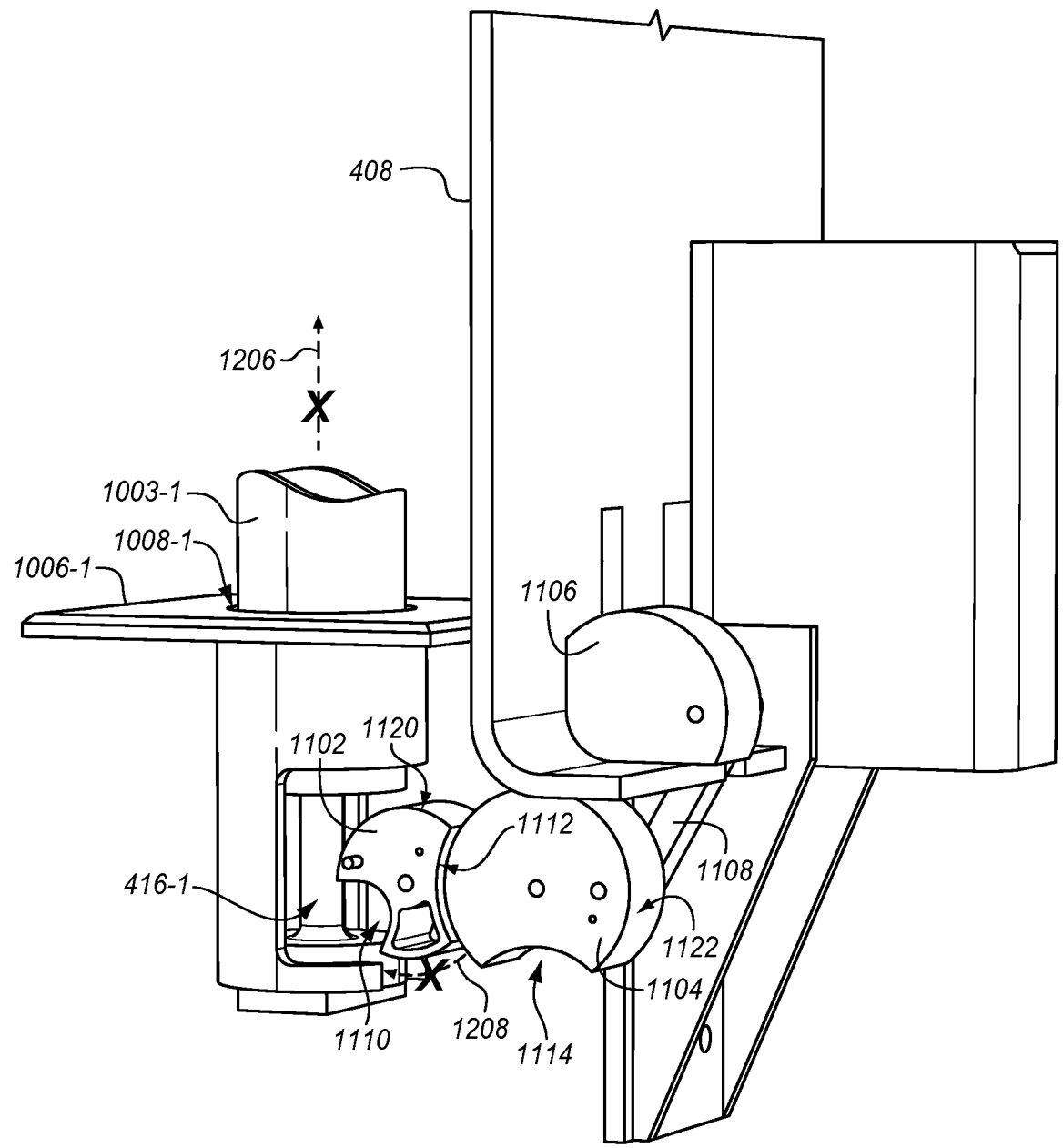

With first member 1102 and second member 1104 both in the second position illustrated in FIG. 14, keyed portion 416-1 of leg 1003-1 of safety barrier 418 is not able to be removed from opening 1008-1 of receptacle 1006-1, because cutout 1110 of first member 1102 is engaged with keyed portion 416-1, and first member 1102 and second member 1104 interfere with each other if leg 1003-1 of safety barrier 418 is moved in the direction of arrow 1206. In particular, cutout 1112 of first member 1102 engages with outside edge 1122 of second member 1104, and cannot rotate in the direction of arrow 1208. This prevents keyed portion 416-1 of safety barrier 418 from being removed from interlock 410 when flip door 408 is open. Closing flip door 408 as depicted in FIG. 12 allows keyed portion 416-1 of safety barrier 418 to be removed from receptacle 1006-1 (e.g., keyed portion 416-1 of leg 1003-1 of safety barrier 418 is removed from opening 1008-1 of receptacle 1006-1 as leg 1003-1 of safety barrier 418 is moved in the direction of arrow 1206)

Although FIGS. 11-14 depict a particular size, orientation, and relationship between first member 1102, second member 1104, third member 1106, and fourth member 1108 of interlock 410, interlock 410 is not limited to this particular size, orientation, and relationship of components. One or ordinary skill in the art will recognize that the functionality described herein for interlock 410 may be achieved in a variety of different ways.

Figure 15:
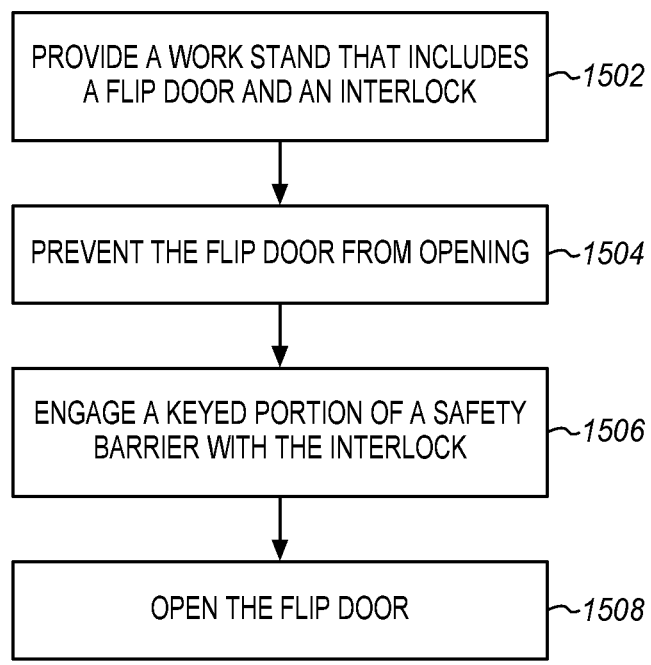
FIG. 15 is a flow chart of a method of operating a flip door assembly in an illustrative embodiment.
Figure 16:
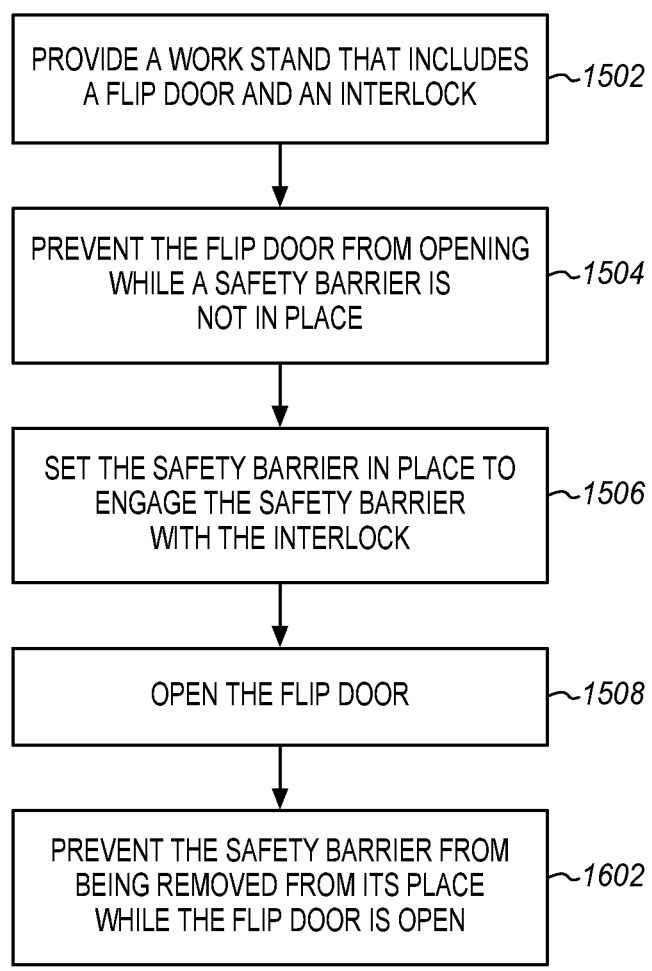
FIGS. 16-17 are flow chart depicting additional details of the method of FIG. 15 in illustrative embodiments.
Figure 17:
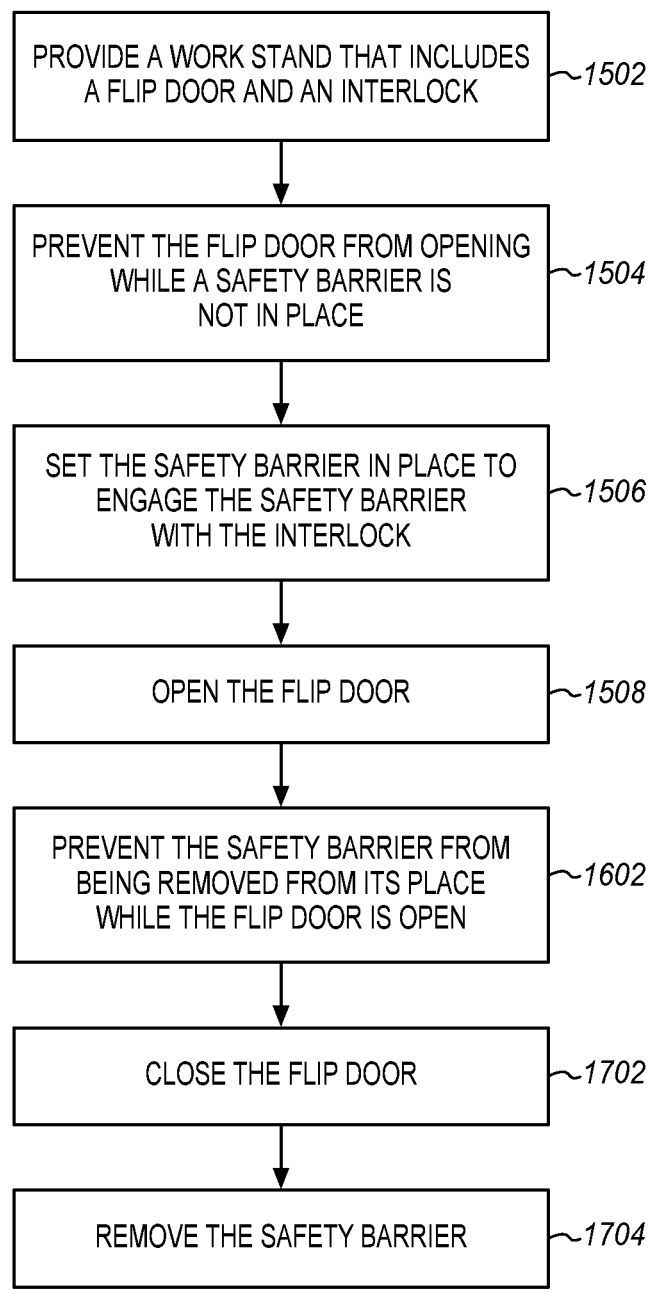

FIG. 15 is a flow chart of a method 1500 of operating a flip door assembly in an illustrative embodiment, and FIGS. 16-17 depict additional details of method 1500 in illustrative embodiments. Method 1500 will be described with respect to flip door assembly 406 of FIGS. 4-14, although method 1500 may be performed by other systems, not shown. Method 1500 may include other steps, not shown. Further, the steps of method 1500 may be performed in an alternate order.

Step 1502 (see FIG. 15) comprises providing work stand 402 that includes flip door 408 and interlock 410 that controls opening and closing of flip door 408 based on whether keyed portion 416 of safety barrier 418 is engaged or disengaged with interlock 410 (see FIG. 4). Step 1504 comprises preventing flip door 408 from opening in response to keyed portion 416 of safety barrier 418 not being engaged with interlock 410 (see FIG. 4, flip door 408 is prevented from opening in the direction of arrow 414). With respect to FIG. 11, for example, first member 1102 and second member 1104 are both in the first position when keyed portion 416-1 is not engaged with interlock 410. When both are in the first position, a selective interference between cutout 1114 of second member 1104 and outside edge 1120 of first member 1102 prevents second member 1104 from rotating in the direction of arrow 1118, thereby preventing flip door 408 from opening.

Step 1506 comprises engaging keyed portion 416 of safety barrier 418 with interlock 410 to prevent access to defined area 504 by a worker (see FIG. 5). With respect to FIG. 12, for example, when keyed portion 416-1 is engaged with cutout 1110 of first member 1102, first member 1102 rotates in the direction of arrow 1204 to remove the interference previously generate between cutout 1114 of second member 1104 and outside edge 1120 of first member 1102.

Step 1508 comprises opening flip door 408, as illustrated in FIG. 6. With keyed portion 416 of safety barrier 418 engaged with interlock 410, flip door 408 is free to open in the direction of arrow 414. Referring to FIG. 13, for example, opening flip door 408 pivots third member 1106, which rotates second member 1104 in the direction of arrow 1118 using fourth member 1108. Outside edge 1122 of second member 1104 is free to rotate into cutout 1112 of first member 1102.

Step 1602 comprises preventing keyed portion 416 of safety barrier 418 from being disengaged from interlock 410 in response to flip door 408 being open. See FIG. 7, which illustrates that safety barrier 418 cannot be moved in the direction of arrow 702 while flip door 408 is open. Referring to FIG. 14, for example, when flip door 408 is open, attempting to remove safety barrier 418 from flip door assembly 406 causes keyed portion 416-1 of leg 1003-1 to attempt to rotate first member 1102 in the direction of arrow 1208, which is prevented by the interference between first member 1102 and second member 1104. In particular, cutout 1112 of first member 1102 engages with outside edge 1122 of second member 1104, preventing first member 1102 from rotating in the direction of arrow 1208. This ensures that leg 1003-1 of safety barrier 418 cannot be removed from interlock 410 when flip door 408 is open.

Step 1702 comprises closing flip door 408, as depicted in FIG. 8. Flip door 408 is allowed to move in the direction of arrow 802 into the closed position illustrated in FIG. 8 because keyed portion 416 of safety barrier 418 remains engaged with interlock 410. Referring to FIG. 12, for example, closing flip door 408 in the direction of arrow 1210 pivots third member 1106, which is translated into a rotation of second member 1104 in the direction of arrow 1119 by fourth member 1108. When second member 1104 rotates in the direction of arrow 1119, the interference between cutout 1112 of first member 1102 and outside edge 1122 of second member 1104 is removed. Step 1704 comprises removing keyed portion 416 of safety barrier 418 from interlock 410 to allow access to defined area 504 by the worker. FIG. 9 depicts safety barrier 418 moved in the direction of arrow 702 to disengage keyed portion 416 from interlock 410 while flip door 408 is closed. Referring to FIG. 12, for example, leg 1003-1 of safety barrier 418 is moved in the direction of arrow 1206, which rotates first member 1102 in the direction of arrow 1208 such that outside edge 1120 of first member 1102 pivots into cutout 1114 of second member 1104 into the orientation depicted in FIG. 11, which prevents flip door 408 from being opened.

Figure 18:
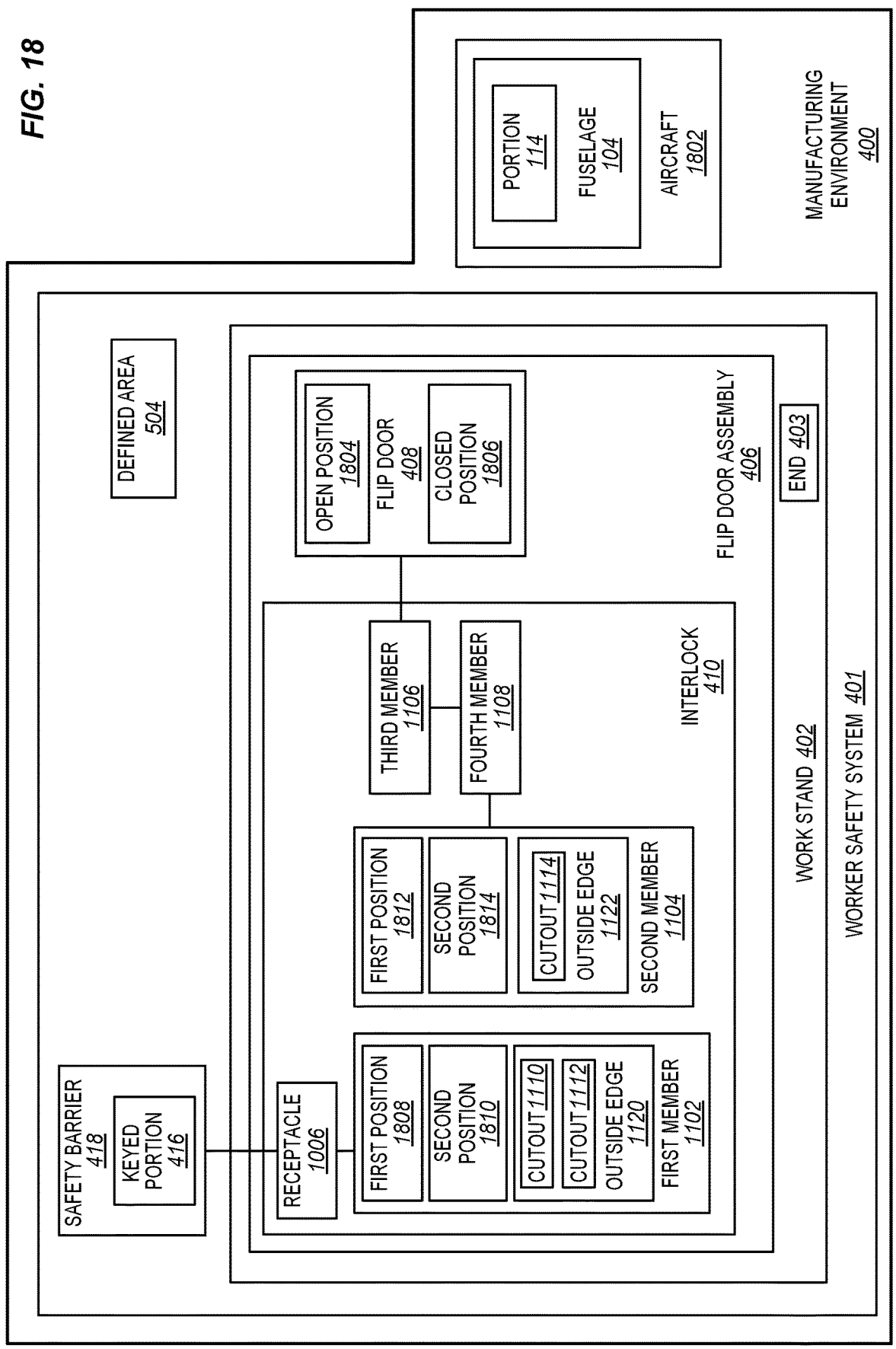
FIG. 18 is a block diagram of a manufacturing environment in an illustrative embodiment.

FIG. 18 is a block diagram of manufacturing environment 400 in an illustrative embodiment. In this embodiment, environment 400 includes worker safety system 401 and fuselage 104 of an aircraft 1802. Worker safety system 401 includes work stand 402 that includes flip door 408 and interlock 410 for flip door 408. Worker safety system 401 further includes safety barrier 418 having keyed portion 416 that prevents access to defined area 504 of worker safety system 401 when keyed portion 416 is engaged with interlock 410. Interlock 410 allows flip door 408 to move to an open position 1804 when keyed portion 416 is engaged with interlock 410, and prevents flip door 408 from moving to open position 1804 when keyed portion 416 is not engaged with interlock 410.

In some embodiments, flip door 408 is proximate to end 403 of work stand 402. When flip door 408 is in open position 1804 and keyed portion 416 is engaged with interlock 410, interlock 410 prevents keyed portion 416 of safety barrier 418 from being disengaged from interlock 410.

In some embodiments, end 403 of work stand 402 is proximate to fuselage 104. In particular, end 403 may be proximate to portion 114 of fuselage 104.

In some embodiments, interlock 410 includes receptacle 1006 that selectively engages with keyed portion 416 of safety barrier 418, and first member 1102. First member 1102 is proximate to receptacle 1006 and is oriented in a first position 1808 when keyed portion 416 of safety barrier 418 is not engaged with receptacle 1006, and is oriented in a second position 1810 when keyed portion 416 is engaged with receptacle 1006. In this embodiment, interlock 410 includes second member 1104 that is proximate to first member 1102. Second member 1104 is oriented in a first position 1812 when flip door 408 is in a closed position 1806, and is oriented in a second position 1814 when flip door 408 is in open position 1804.

In this embodiment, a selective interference between first member 1102 and second member 1104 allows second member 1104 to transition between first position 1812 and second position 1814 when first member 1102 is oriented in second position 1810, and prevents second member 1104 from translating between first position 1812 and second position 1814 when first member 1102 is oriented in first position 1808.

In one embodiment, interlock 410 further includes third member 1106 that is affixed to flip door 408, and fourth member 1108 coupling third member 1106 to second member 1104. Fourth member 1108 transitions second member 1104 from first position 1812 to second position 1814 when flip door 408 moves from closed position 1806 to open position 1804, and transitions second member 1104 from second position 1814 to first position 1812 when flip door 408 moves from open position 1804 to closed position 1806.

In an embodiment, the selective interference between first member 1102 and second member 1104 prevents keyed portion 416 of safety barrier 418 from being removed from receptacle 1006 when second member 1104 is oriented in second position 1814.

In an embodiment, first member 1102 includes cutout 1110 that is proximate to receptacle 1006. Cutout 1110 engages with keyed portion 416 of safety barrier 418 to translate first member 1102 between first position 1808 and second position 1810.

In some embodiments, flip door 408 in open position 1804 provides access to portion 114 of fuselage 104 of aircraft 1802 that was obscured by flip door 408 when flip door 408 was in closed position 1806.

In an embodiment, interlock 410 and flip door 408 may be collectively referred to as flip door assembly 406.

Figure 19:
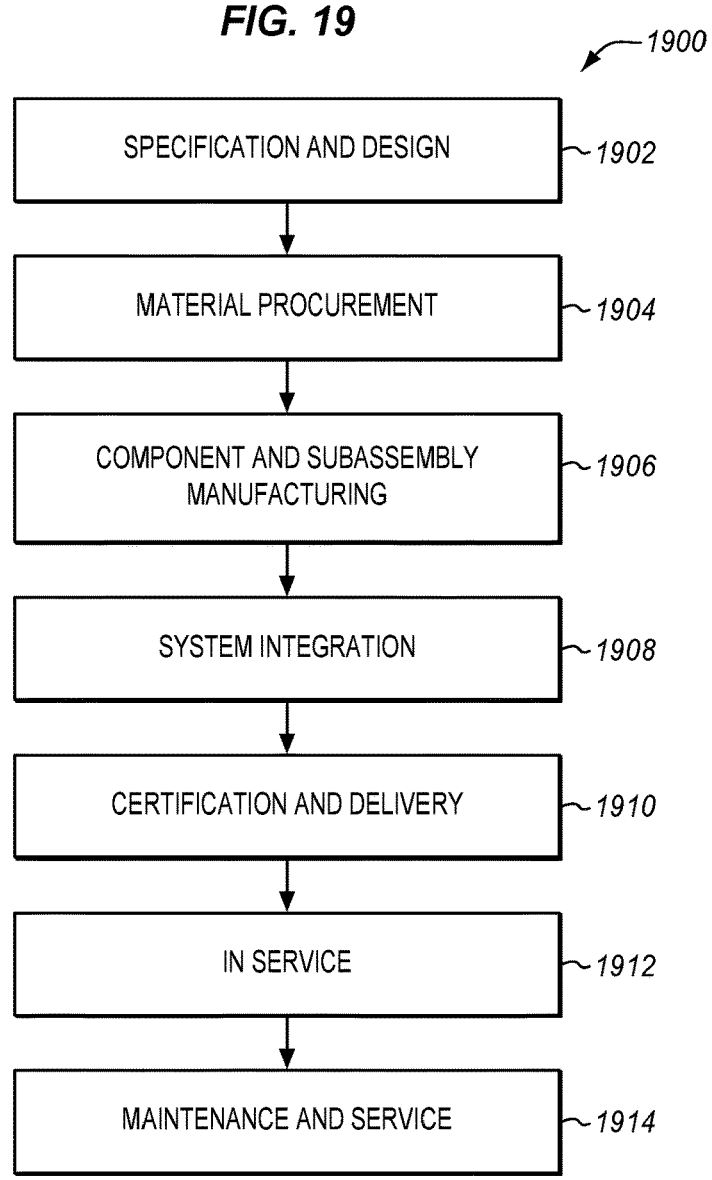
FIG. 19 is a flow chart illustrating an aircraft manufacturing and service method in an illustrative embodiment.
Figure 20:
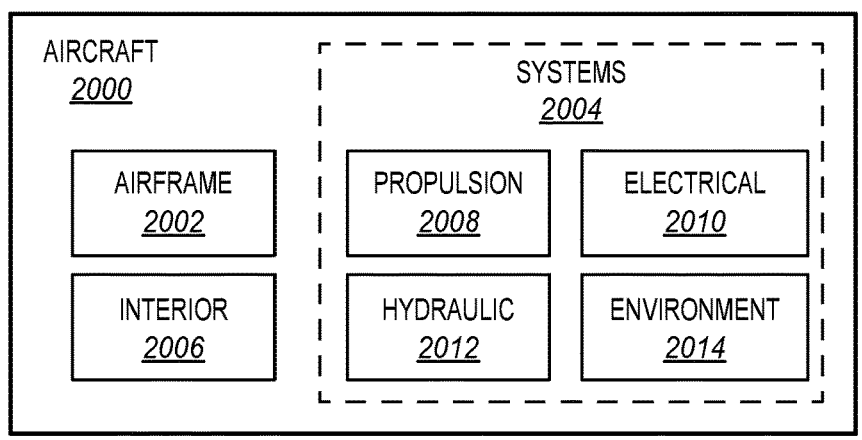
FIG. 20 is a schematic diagram of an aircraft in an illustrative embodiment.

The embodiments of the disclosure may be described in the context of an aircraft manufacturing and service method 1900 as shown in FIG. 19 and an aircraft 2000 as shown in FIG. 20. During pre-production, exemplary method 1900 may include a specification and design 1902 of aircraft 2000, and material procurement 1904. During production, component and subassembly manufacturing 1906 and system integration 1908 of aircraft 2000 takes place. Thereafter, aircraft 2000 may go through certification and delivery 1910 in order to be placed in service 1912. While in service by a customer, aircraft 2000 is scheduled for routine maintenance and service 1914 (which may also include modification, reconfiguration, refurbishment, and so on).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 20, aircraft 2000 produced by exemplary method 1900 may include an airframe 2002 with a plurality of systems 2004 and an interior 2006. Examples of high-level systems 2004 include one or more of propulsion systems 2008, an electrical system 2010, a hydraulic system 2012, and an environmental system 2014. Any number of other systems may be included. Although an aerospace example is shown, the principles described in this specification may be applied to other industries, such as the automotive industry.

Apparatus and methods embodied herein may be employed during any one or more of the stages of the production and service method 1900. For example, components or subassemblies corresponding to process 1906 may be fabricated or manufactured in a manner similar to components or subassemblies produced while aircraft 2000 is in service. Also, one or more apparatus embodiments, method embodiments, or a combination thereof may be utilized during the component subassembly and manufacturing 1906 and system integration 1908, for example, by substantially expediting assembly of or reducing the cost of aircraft 2000. Similarly, one or more of apparatus embodiments, method embodiments, or a combination thereof may be utilized while aircraft 2000 is in service, for example and without limitation, to maintenance and service 1914.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A worker safety system comprising:
a work stand;
a safety barrier having a keyed portion; and
a flip door assembly of the work stand configured to selectively engage with the keyed portion of the safety barrier to prevent access to a defined area by a worker, the flip door assembly comprising:
a flip door rotatably connected to the work stand via at least one rotating member, and configured to pivot via the at least one rotating member between a closed position where a top surface of the flip door is substantially coplanar with a top surface of the work stand, and an open position where the top surface of the flip door forms an angle with the top surface of the work stand; and
an interlock configured to prevent the flip door from pivoting to the open position when the keyed portion of the safety barrier is disengaged from the interlock, and to allow the flip door to pivot to the open position when the keyed portion of the safety barrier is engaged with the interlock.

2. The worker safety system of claim 1, wherein:
the defined area is proximate to an end of the work stand.

3. The worker safety system of claim 1, wherein:
the interlock is configured to prevent the keyed portion of the safety barrier from being disengaged from the interlock when the flip door is in the open position.

4. The worker safety system of claim 1, wherein the interlock comprises:
a receptacle configured to selectively engage with the keyed portion of the safety barrier;
a first rotatable member proximate to the receptacle;
a second rotatable member proximate to the first rotatable member;
a third member affixed to the flip door; and
a fourth member coupling the third member to the second member, wherein pivoting of the flip door causes rotation of the second rotatable member via the third member and the fourth member;
wherein the first rotatable member is configured to rotate to a first position, when the keyed portion of the safety barrier is not engaged with the receptacle, to interfere with rotation of the second rotatable member and prevent the flip door from pivoting to the open position.

5. The worker safety system of claim 4, wherein:
the first rotatable member is configured to rotate to a second position, when the keyed portion of the safety barrier is engaged with the receptacle, so that the first rotatable member does not interfere with rotation of the second rotatable member allowing the flip door to pivot to the open position.

6. The worker safety system of claim 5, wherein:
the second rotatable member interferes with rotation of the first rotatable member when the flip door is at the open position to prevent the keyed portion of the safety barrier from being removed from the receptacle.

7. The worker safety system of claim 6, wherein:
the first rotatable member includes a cutout proximate to the receptacle that engages with the keyed portion of the safety barrier.

8. A method of operating a worker safety system in a manufacturing environment, the method comprising:
providing a work stand that includes a flip door assembly configured to selectively engage with a keyed portion of a safety barrier to prevent access to a defined area by a worker, wherein the flip door assembly comprises:
a flip door rotatably mounted to the work stand via at least one rotating member, and configured to pivot via the at least one rotating member between a closed position where a top surface of the flip door is substantially coplanar with a top surface of the work stand, and an open position where the top surface of the flip door forms an angle with the top surface of the work stand; and
an interlock configured to prevent the flip door from pivoting to the open position when the keyed portion of the safety barrier is disengaged from the interlock, and to allow the flip door to pivot to the open position when the keyed portion of the safety barrier is engaged with the interlock;
preventing the flip door from opening to the open position in response to the keyed portion of the safety barrier not being engaged with the interlock;
engaging the keyed portion of the safety barrier with the interlock; and
opening the flip door to the open position with the keyed portion of the safety barrier engaged with the interlock.

9. The method of claim 8, further comprising:
preventing the keyed portion of the safety barrier from being disengaged from the interlock when the flip door is in the open position.

10. The method of claim 8, further comprising:
moving the flip door to the closed position; and
removing the keyed portion of the safety barrier from the interlock.

11. The method of claim 8, wherein:
the defined area is proximate to an end of the work stand.

12. A worker safety system for a manufacturing environment, the worker safety system comprising:
a work stand elevated above a floor with supports, and configured for a worker to perform a manufacturing process on a fuselage; and
a safety barrier;
the work stand comprising a walking surface and a flip door, wherein the flip door is configured to pivot in a first direction to a closed position where a top surface of the flip door is substantially coplanar with the walking surface, and to pivot in a second direction to an open position where the top surface of the flip door is not substantially coplanar with the walking surface;

the work stand further comprising an interlock configured to prevent the flip door from pivoting to the open position;

the safety barrier is configured to prevent access by the worker to an area of the flip door, the safety barrier includes a keyed portion configured to engage with the interlock, and the interlock is configured to prevent the flip door from pivoting to the open position unless the keyed portion of the safety barrier is engaged with the interlock.

13. The worker safety system of claim 12, wherein:

the interlock is configured to allow the flip door to pivot to the open position when the keyed portion of the safety barrier is engaged with the interlock.

14. The worker safety system of claim 12, wherein:

the interlock is configured to prevent the keyed portion of the safety barrier from disengaging from the interlock when the flip door is in the open position.

15. The worker safety system of claim 12, wherein the interlock comprises:

a receptacle configured to selectively engage with the keyed portion of the safety barrier;

a first rotatable member proximate to the receptacle, the first rotatable member is oriented in a first position when the keyed portion of the safety barrier is not engaged with the receptacle, and is oriented in a second position when the keyed portion of the safety barrier is engaged with the receptacle;

a second rotatable member proximate to the first rotatable member;

a third member affixed to the flip door; and a fourth member coupling the third member to the second member, wherein pivoting of the flip door causes rotation of the second rotatable member via the third member and the fourth member;

wherein the first rotatable member oriented in the first position interferes with rotation of the second rotatable member to prevent the flip door from pivoting to the open position.

16. The worker safety system of claim 15, wherein:

the first rotatable member oriented in the second position does not interfere with rotation of the second rotatable member allowing the flip door to pivot to the open position.

17. The worker safety system of claim 15, wherein:

when the first rotatable member is oriented in the second position, the second rotatable member interferes with rotation of the first rotatable member when the flip door is at the open position to prevent the keyed portion of the safety barrier from being removed from the receptacle.

18. The worker safety system of claim 17, wherein:

the first rotatable member includes a cutout proximate to the receptacle that engages with the keyed portion of the safety barrier.

19. The worker safety system of claim 15, wherein:

when the first rotatable member is oriented in the first position, an outside edge of the first rotatable member is positioned in a cutout in an outside edge of the second rotatable member to interfere with rotation of the second rotatable member.

20. The worker safety system of claim 19, wherein:

when the first rotatable member is oriented in the second position, a cutout on the outside edge of the first rotatable member faces the outside edge of the second rotatable member to not interfere with rotation of the second rotatable member.

\* \* \* \* \*